(12) United States Patent  
Geurts

(10) Patent No.: US 9,843,745 B2  
(45) Date of Patent: Dec. 12, 2017

(54) IMAGE SENSOR PIXELS HAVING SEPARATED CHARGE STORAGE REGIONS

(71) Applicant: SEMICONDUCTOR COMPONENTS INDUSTRIES, LLC, Phoenix, AZ (US)

(72) Inventor: Tomas Geurts, Haasrode (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/145,558

(22) Filed: May 3, 2016

(65) Prior Publication Data

US 2017/0324915 A1 Nov. 9, 2017

(51) Int. Cl.
| | |
|---|---|
| *H04N 5/217* | (2011.01) |
| *H04N 5/353* | (2011.01) |
| *H04N 5/372* | (2011.01) |
| *H04N 5/369* | (2011.01) |

(52) U.S. Cl.
CPC ......... *H04N 5/3532* (2013.01); *H04N 5/3698* (2013.01); *H04N 5/372* (2013.01)

(58) Field of Classification Search
CPC ........... H01L 27/1463; H01L 27/14643; H01L 27/14689; H01L 27/14612; H01L 27/14614; H01L 27/14641; H01L 27/14609; H01L 29/7869; H01L 27/1225; H01L 29/24

See application file for complete search history.

(56) References Cited

U.S. PATENT DOCUMENTS

| | | | |
|---|---|---|---|
| 6,750,523 B2 | 6/2004 | Blanchard | |
| 7,271,835 B2* | 9/2007 | Iizuka | H01L 27/14609 |
| | | | 257/E27.132 |
| 8,441,561 B2* | 5/2013 | Okado | H04N 5/361 |
| | | | 348/207.99 |
| 8,792,029 B2 | 7/2014 | Lee | |
| 9,653,503 B2* | 5/2017 | Lee | H01L 27/14643 |
| 9,741,754 B2* | 8/2017 | Li | H01L 27/14609 |
| 2011/0069189 A1 | 3/2011 | Venkataraman et al. | |
| 2015/0009354 A1 | 1/2015 | Venkataraman et al. | |

(Continued)

*Primary Examiner* — Trung Diep  
(74) *Attorney, Agent, or Firm* — Treyz Law Group, P.C.; Michael H. Lyons; David K. Cole

(57) ABSTRACT

An image sensor may include pixel having nested photosensitive regions. A pixel with nested photosensitive regions may include an inner photosensitive region that has a rectangular light collecting area. The inner photosensitive region may be formed in a substrate and may be surrounded by an outer photosensitive region. The pixel with nested photosensitive regions may include trunk circuitry and transistor circuitry. Trunk circuitry may include a voltage supply source, a charge storage node, and readout transistors. Trunk circuitry may be located in close proximity to both the inner and outer photosensitive regions. Transistor circuitry may couple the inner photosensitive region, the outer photosensitive region, and trunk circuitry to one another. Microlenses may be formed over the nested photosensitive groups. Hybrid color filters having a single color filter region over the inner photosensitive region and a portion of the outer photosensitive region may also be used.

20 Claims, 21 Drawing Sheets

(56) References Cited

U.S. PATENT DOCUMENTS

2016/0064430 A1\* 3/2016 Lee ................... H01L 27/1463
 348/302
2016/0100113 A1\* 4/2016 Oh ...................... H04N 5/3592
 348/296

\* cited by examiner

IMAGE SENSOR PIXELS HAVING SEPARATED CHARGE STORAGE REGIONS

BACKGROUND

This relates generally to imaging sensors, and more particularly, to imaging sensors with pixels that include more than one photosensitive region.

Modern electronic devices such cellular telephones, cameras, and computers often use digital image sensors. Imagers (i.e., image sensors) include a two-dimensional array of image sensing pixels. Each pixel includes a photosensor such as a photodiode that receives incident photons (light) and converts the photons into electrical charges. An image sensing pixel in the two-dimensional array of image sensing pixels includes a single photosensitive region and a color filter formed over the photosensitive region.

When viewed as a whole, the array of color filters associated with the array of image sensing pixels in the image sensor is referred to as a color filter array. Ideally, photosensitive regions associated with a pixel having a red color filter would only be exposed to light that has passed through a red color filter, photosensitive regions associated with a pixel having a green color filter would only be exposed to light that has passed through a green color filter, and photosensitive regions associated with a pixel having a blue color filter would only be exposed to light that has passed through a blue color filter, etc.

However, there is often undesired optical cross-talk between adjacent pixels associated with different colors (i.e., having color filters of different colors). Optical cross-talk can degrade the output image quality of an imager.

It would therefore be desirable to be able to provide improved image pixels for imaging devices.

DETAILED DESCRIPTION

Embodiments of the present invention relate to image sensors, and more particularly, to image sensors having pixels that each contain multiple photosensitive regions. It will be recognized by one skilled in the art, that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices include image sensors that gather incoming light to capture an image. The image sensors may include arrays of image pixels. The image pixels in the image sensors may include photosensitive elements such as photodiodes that convert the incoming light into electric charge. The electric charges may be stored and converted into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the imaging pixels and readout circuitry for reading out image signals corresponding to the electric charge generated by the photosensitive elements.

Image sensors may be provided with one or more arrays of multi-photodiode image pixels (sometimes referred to herein as image pixels or pixels). Multi-photodiode image pixels may include photosensitive elements formed in a substrate and that are adjacent to one another. Each multi-photodiode image pixel may have two, three, five, nine, or any other suitable number of photodiodes. The multiple photodiodes in each donut pixel may be grouped into an outer photosensitive region and an inner photosensitive region. It may be desirable for the outer photosensitive region of a pixel to be more sensitive to incident light than the inner photosensitive region, for example. The outer photosensitive region may include one, two, four, eight, or any other suitable of photosensitive regions (e.g., photodiodes). The inner photosensitive region may include one or more photodiodes. One or more microlenses or other light guiding structures may be formed over the multi-photodiode image pixel to direct light to the photodiode(s) in the outer photosensitive region.

Figure 1:
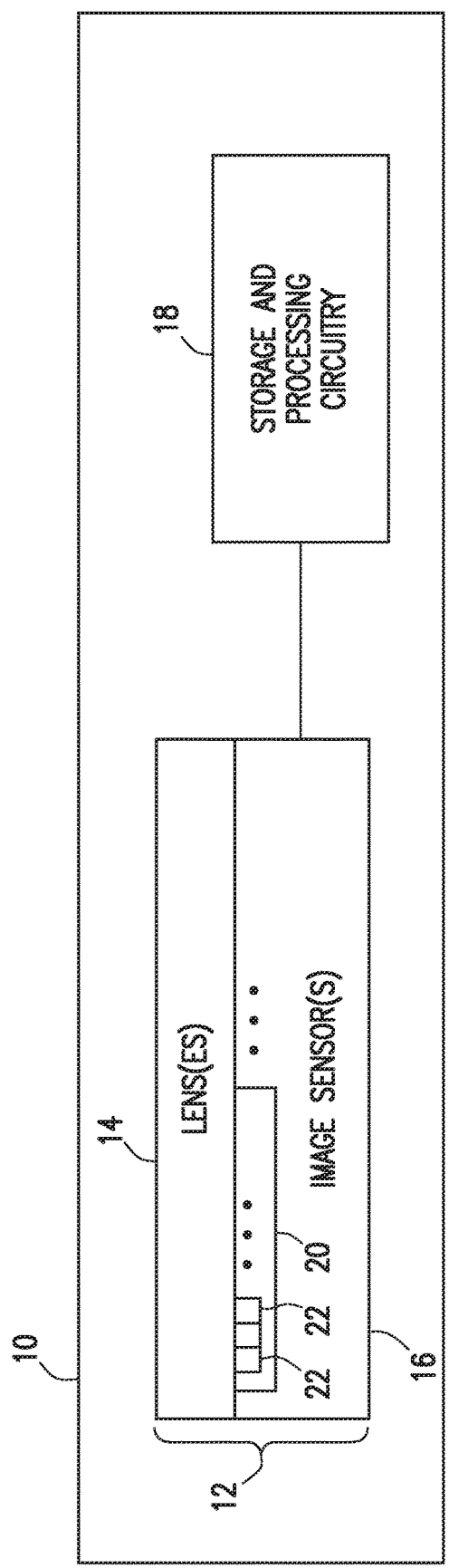
FIG. 1 is a diagram of an illustrative imaging system in accordance with an embodiment.

FIG. 1 is a diagram of an illustrative imaging system that uses an image sensor to capture images. Imaging system 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. During image capture operations, light from a scene may be focused onto image sensor 16 by lens 14. Image sensor 16 provides corresponding digital image data to processing circuitry 18. Image sensor 16 may, for example, be a backside illumination image sensor. If desired, camera module 12 may be provided with an array of lenses 14 and an array of corresponding image sensors 16.

Control circuitry such as storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18. Processing circuitry 18 may be used in controlling the operation of image sensors 16.

Image sensors 16 may include one or more arrays 20 of image pixels 22. Image pixels 22 may be formed in a semiconductor substrate using complementary metal-oxide-semiconductor (CMOS) technology or charge-coupled device (CCD) technology or any other suitable photosensitive devices. Image pixels 22 may be frontside illumination (FSI) image pixels or backside illumination (BSI) image pixels. Image pixels 22 may include one or more photosensitive regions. Each photosensitive region in an image pixel 22 may have a photodiode or photodiode region and readout circuitry for the photodiode or photodiode region. Readout circuitry associated with each photodiode or photodiode region in a given photosensitive region may include transfer gates, floating diffusion regions, and reset gates. Isolation regions between photosensitive regions may also be considered part of either or both of the photosensitive regions between which the isolation structure is formed.

Figure 2:
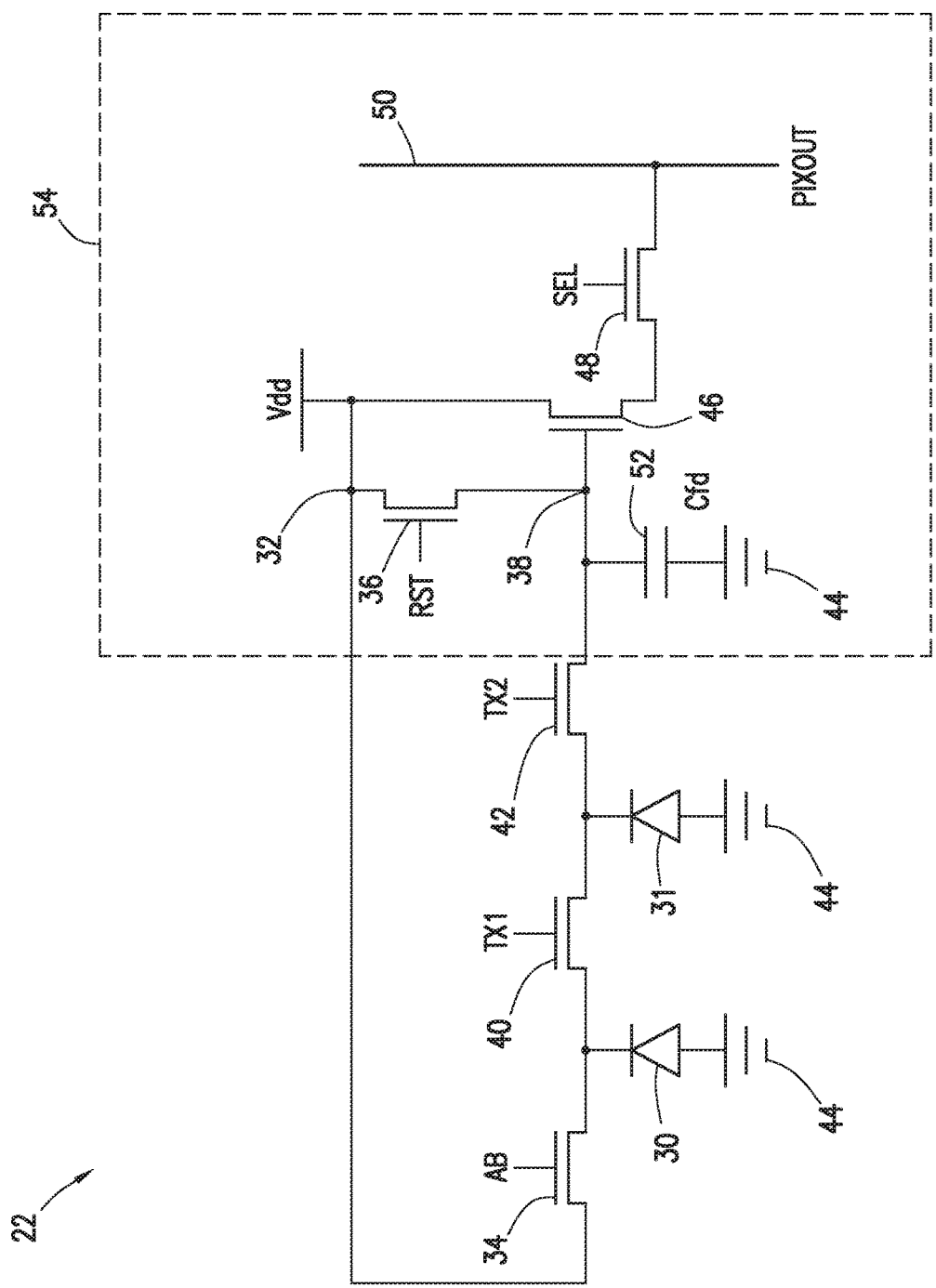
FIG. 2 is a circuit diagram of an illustrative image sensor pixel having multiple photosensitive regions in accordance with an embodiment.

FIG. 2 is a circuit diagram of an illustrative image sensor pixel 22 having multiple charge storage regions. Pixel 22 may be operable in either rolling shutter or global shutter mode. As shown in FIG. 2, pixel 22 may include multiple photosensitive regions such as photodiodes 30 and 31. This is merely illustrative and, in general, regions 30 and 31 may be any desired photosensitive structures that generate charge in response to light. A first (positive) power supply voltage Vdd may be supplied at positive power supply terminal 32. Power supply terminal 32 may be coupled to photodiode 30 through anti-blooming gate 34. Power supply terminal 32 may be coupled to photodiode 31 through anti-blooming gate 34 and first charge transfer transistor 40. Power supply terminal 32 may also be coupled to photodiode 31 through reset transistor 36 and second charge transfer transistor 42. Incoming light may be collected by photodiodes 30 and 31. Photodiodes 30 and 31 may generate charge (e.g., electrons or holes) in response to impinging photons. The amount of charge that is collected by photodiodes 30 and 31 may depend on the intensity of the impinging light and the exposure duration (or integration time) for the respective photodiodes, for example.

Before an image is acquired, reset control signal RST may be asserted. Asserting signal RST turns on reset transistor 36 and resets charge storage node 38 (also referred to as floating diffusion region FD) to Vdd. Reset control signal RST may then be deasserted to turn off reset transistor 36. Similarly, prior to charge integration, an anti-blooming signal AB may be pulsed high to reset photodiode 30 to power supply voltage Vdd (e.g., by passing Vdd to photodiode 30 through anti-blooming gate 34).

First charge transfer transistor 40 may transfer charge from photodiode 40 to photodiode 31 (sometimes called charge storage region or node 31). Charge storage region 31 may be a doped semiconductor region (e.g., a doped silicon region formed in a silicon substrate by ion implantation, impurity diffusion, or other doping techniques) that is capable of temporarily storing charge transferred from photodiode 30. Photodiode 31 (sometimes referred to as a storage diode) is capable of temporarily storing transferred charge. Photodiodes 30 and 31 may be coupled to a ground power supply terminal 44. First charge transfer control signal TX1 may be pulsed high to transfer charge from photodiode 30 into photodiode 31 through transistor 40. In the global shutter mode, signal TX1 may, for example, be pulsed high simultaneously for all pixels 22 in array 20.

Pixel 22 may include second transfer gate (transistor) 42. Transfer gate 42 may have a gate terminal that is controlled by second charge transfer control signal TX2. Transfer control signal TX2 may be pulsed high to transfer charge from photodiode 31 into floating diffusion region 38. Floating diffusion region 38 may be a doped semiconductor region (e.g., a region in a silicon substrate that is doped by ion implantation, impurity diffusion, or other doping processes), for example. Floating diffusion region 38 may serve as another storage region for storing charge during image data gathering operations. Floating diffusion region 38 may have a charge storage capacity (capacitance) as shown by capacitor 52 having capacitance Cfd.

Pixel 22 may include readout circuitry that includes row-select transistor 48 and source-follower transistor 46. Transistor 48 may have a gate that is controlled by row select control signal SEL. When control signal SEL is asserted, transistor 48 is turned on and a corresponding signal PIX-OUT (e.g. an output signal having a magnitude that is proportional to the amount of charge at floating diffusion node 38) is passed onto column readout path 50. Portion 54 of pixel 22 may sometimes be referred to herein as trunk 54. Trunk 54 may include a power supply that supplies voltage Vdd, terminal 32, reset transistor 36, floating diffusion node 38, floating diffusion capacitor 52, readout transistors 46 and 48, readout line 50, and portions of other control and readout lines associated with pixel 22. Trunk 54 may include non-photoactive components of pixel 22 and may be differentiated from photoactive components (e.g., photodiodes 30 and 31), as well as their respective transfer gates (transistors 40 and 42).

Photodiodes 30 and 31 may have different physical sizes (areas). On die, photodiodes 30 and 31 may have any desired shapes. Pixel 22 may, for example, have a nested multi-photodiode architecture that includes an inner photosensitive region and an outer photosensitive region that surrounds the inner photosensitive region. In this arrangement, photodiode 30 may be formed within an outer photosensitive region that includes photodiode 31. In other words, on image sensor 16, photosensitive region 31 may be nested within or otherwise surrounded by photosensitive region 30. As an example, photodiode 30 may be physically larger than photodiode 31 (e.g., photodiode 30 may have greater storage capacity than photodiode 31). Since photodiode 30 is larger than photodiode 31, photodiode 31 may have lower sensitivity to incident light. Photodiode 30 may then have higher sensitivity to incident light. Photodiodes 30 and 31 may also have different integration times (e.g., exposure times). As a further example, photodiode 30 may have a longer exposure time compared to photodiode 31. The differences in physical size and integration times may allow photodiode 30 to collect more incident light and generate more corresponding electrical charge. Consequently, photodiode 31 may collect less light and generate less corresponding electrical charge. Photodiodes 30 and 31 may collect light simultaneously. In the scenario of differing exposure time, the exposure times for photodiodes 30 and 31 may overlap.

Pixels 22 may be operated in a low conversion gain mode for capturing images of brighter scenery and in a high conversion gain mode for capturing images of darker scenery. During image capture operations, portions of pixels 22 may capture image signals from darker portions of an imaged scene whereas other portions of pixel 22 may capture image signals from brighter portions of the imaged scene. The simultaneous operation with using a low-exposure photodiode (e.g., photodiode 31) and high-exposure photodiode (e.g., photodiode 30) may allow more time-efficient high-dynamic range (HDR) operation within the same pixel.

Pixels 22 may be provided with gain selection circuitry that enhances the dynamic range of the images produced by image sensor 16. For example, each pixel 22 may generate a corresponding signal using a selected conversion gain setting (conversion gain mode). In some configurations, a selected gain setting may depend on the amount of light captured by the pixel during an exposure (i.e., an integration period between resets of the pixel during which a photosensitive element generates charges in response to incoming light). In other configurations, the gain may be kept at a constant setting.

When HDR is not required, photodiodes 30 and 31 may sum their respective stored charges before transferring their charge to node 38. As an example, after exposure has occurred, TX1 may turn on transistor 40. This allows charge stored in photodiode 30 to transfer to photodiode 31. The sum of the charges stored in respective photodiodes 30 and 31 may be stored on photodiode 31. TX2 may then turn on transistor 42 to transfer the combined charges to floating diffusion node 38. When reading out the combined charges, SEL may turn on transistor 48. PIXOUT may carry a signal proportional to the combined charges on floating diffusion node 38 out of the pixel over line 50.

Also, when HDR is not required, photodiode 31 may act as a storage diode. In general, the physical size (area) of storage node 31 is inversely proportional to the global shutter efficiency of image sensor 16. For example, larger storage nodes 31 may cause sensor 16 to have reduced global shutter efficiency than when smaller storage nodes 31 are used. Insufficient global shutter efficiency may result in ghosting or shadowing in the final image. In addition, larger storage nodes 31 may generate more undesirable dark current in the system than smaller storage nodes 31. In order to mitigate ghosting and shadowing in the final image and to reduce the influence of dark currents in the system, it may be desirable to reduce the size of charge storage node 31. For example, storage node 31 may have a physical size that is at least five times smaller than photodiode 30. While reducing the physical size of storage node 31 may increase the global shutter efficiency and reduce dark current in the system, reducing the physical size of storage node 31 also reduces the charge storage capacity of node 31.

Figure 3:
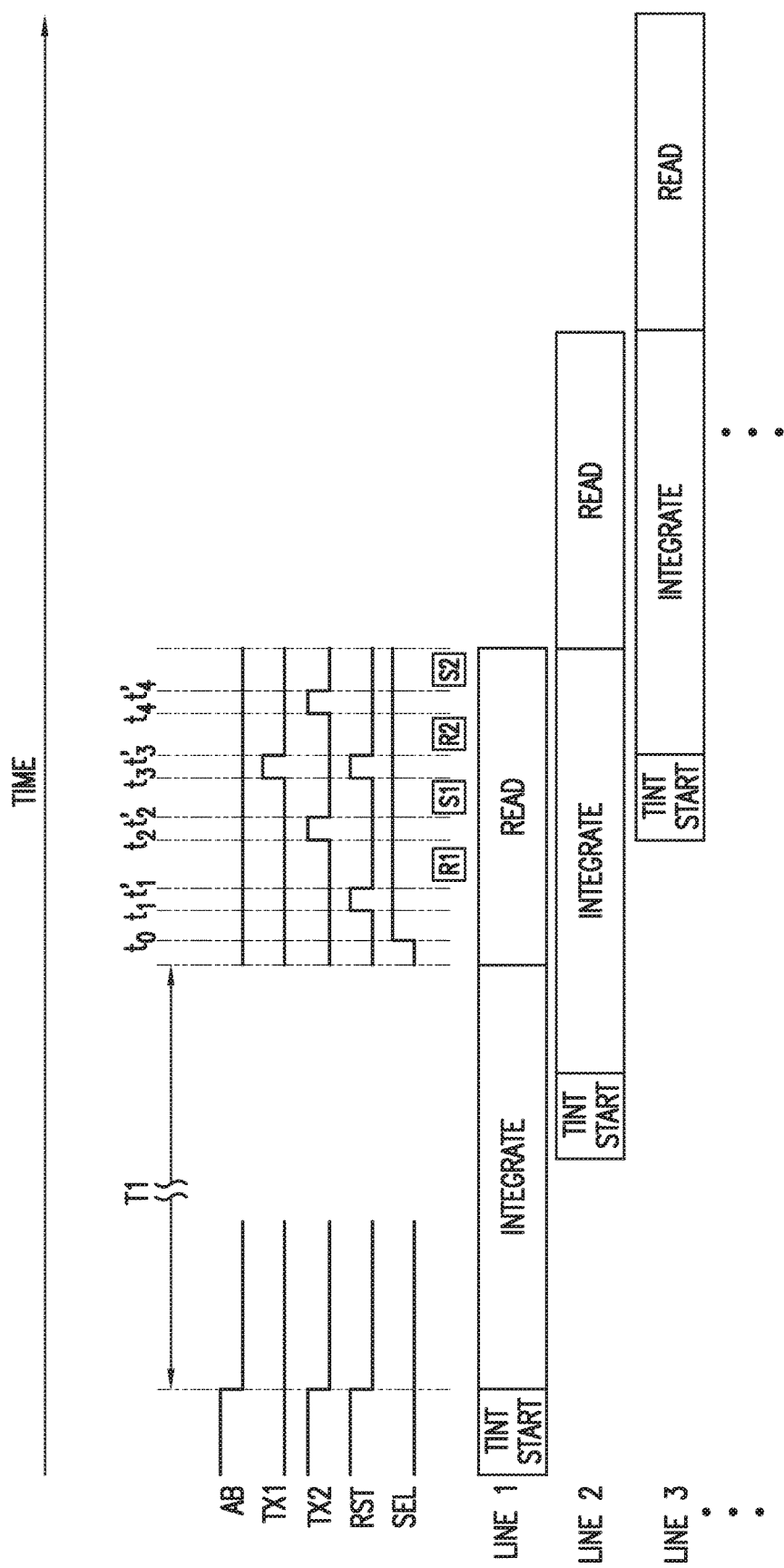
FIG. 3 is a timing diagram for operating the illustrative pixel shown in FIG. 2 in rolling shutter mode in accordance with an embodiment.

FIG. 3 is a timing diagram of rolling shutter operation for illustrative pixels of the type shown in FIG. 2. During rolling shutter operation, an integration process may begin with photodiodes 30 and 31 accumulating charge for a particular pixel 22 during period T1. After the integration process is complete, a readout process may occur, starting with asserting row select signal SEL at time $t_0$ to enable a row select transistor (e.g., transistor 48 in FIG. 2). Time $t_0$ is shown to be before times $t_1$ and $t_1'$, as an example. In a further example, time $t_0$ may be the same time as or after time $t_1'$, as to first readout the first reset signal. The row select transistor may be continuously enabled (e.g., turned on) until the last relevant charge signal (e.g., a second image charge signal originally from PD 30) from pixel 22 is readout. Reset signal RST may enable a reset transistor (e.g., transistor 36 of FIG. 2) at time $t_1$. When reset transistor 36 is enabled, a reset voltage (e.g., voltage Vdd in FIG. 2) may be applied to a FD node (e.g., node 38 in FIG. 2). Signal RST may be deasserted at time $t_1'$ when the reset is complete.

Subsequently, row select transistor 48 may readout a reset level signal corresponding to the reset voltage level at FD node 38. Charge transfer signal TX2 may enable a charge transfer transistor (e.g., transistor 42 in FIG. 2) at time $t_2$, allowing charge stored in a photodiode (e.g., photodiode 31 in FIG. 2) to transfer to FD node 38. Subsequently, row select transistor may readout a first image signal corresponding to the charge originally stored in photodiode 31. Signal TX2 may be deasserted at time $t_2'$ when the charge transfer is complete.

At time $t_3$ charge transfer signal TX1 and reset signal RST may simultaneously enable transfer gate 40 and reset transistor 36, respectively. When transfer gate 40 is enabled, charge originally stored in photodiode 30 may transfer to photodiode 31 and may be temporarily stored in photodiode 31. When reset transistor 36 is enabled, a reset voltage may be applied again to FD node 38, and subsequently readout similarly as when the first reset level was readout. Signals TX1 and RST may then be deasserted at time $t_3'$.

Charge transfer signal TX2 may enable transfer gate 42 again at time $t_4$ to allow the charge temporarily stored in photodiode 31 to transfer to FD node 38. Row select transistor may readout a second image signal corresponding to the charge originally stored in photodiode 30. Signal TX2 may be again deasserted at time $t_4'$. Once the particular pixel image signals have been readout, pixel image signals from other pixels may be readout in a similar way. The corresponding period of integration T1 for other pixels may occur such that the readout process of image signals occurs continuously from one pixel to the next as shown in a bottom portion of FIG. 3.

Figure 4:
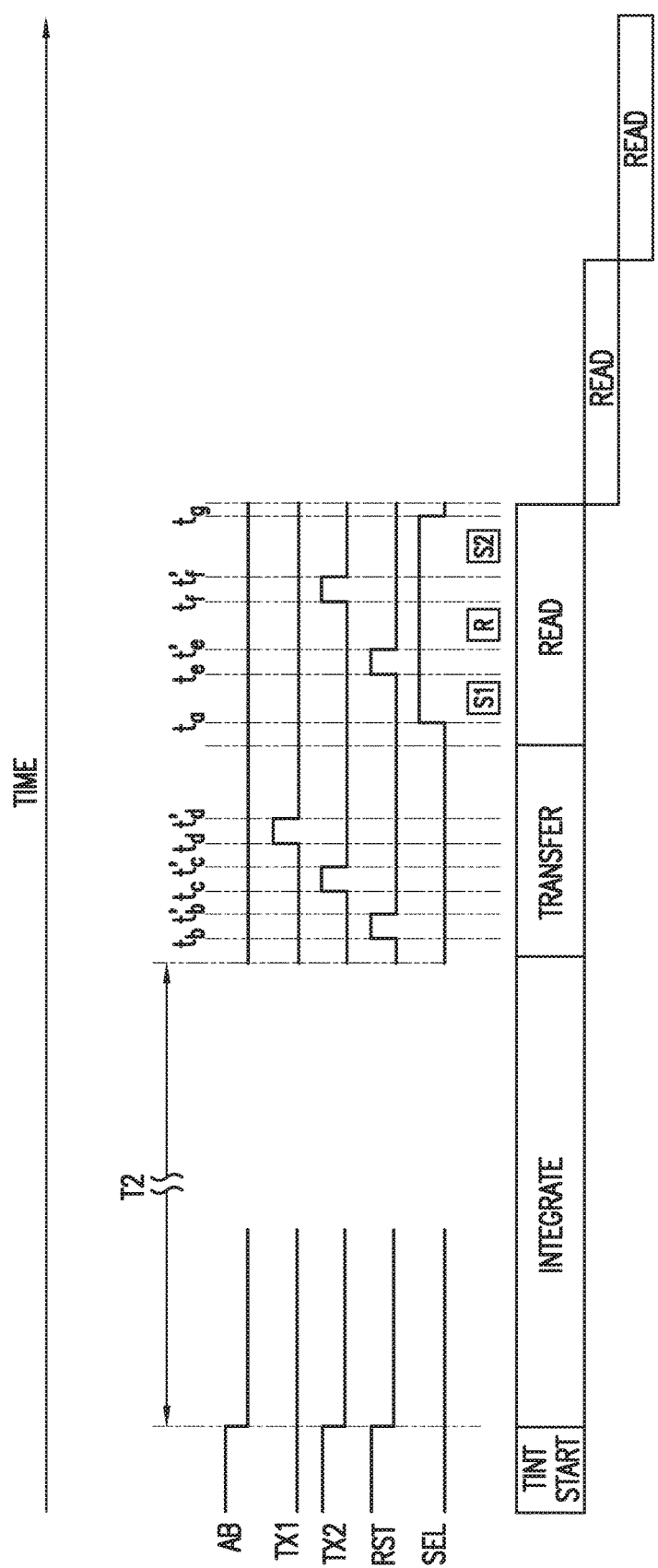
FIG. 4 is a timing diagram for operating the illustrative pixel shown in FIG. 2 in global shutter mode in accordance with an embodiment.

FIG. 4 is a timing diagram of global shutter operation for illustrative pixels of the type shown in FIG. 2. During global shutter operation, photodiodes 30 and 31 from pixels 22 in all columns may simultaneously collect light, generate charge signals, and store them during period T2. Integration period T2 may begin with a common reset by enabling reset transistor 36 and end when all desired image signal charges are stored in each photodiode. This entire process may sometimes be referred to as light collection or integration process. After the integration process, individual pixel processes may begin, starting with a transfer process. At time $t_b$, reset signal RST may first enable reset transistor 36 to apply a reset voltage (e.g., voltage Vdd in FIG. 2) to a FD node (e.g., node 38 in FIG. 2), then disable (e.g., turn off) transistor 36 at time $t_b'$. At time $t_c$, Charge transfer signal TX2 may enable transistor 42 to transfer charge stored in photodiode 31 to node 38, then disable (e.g., turn off) transistor 42 at time $t_a'$. Similarly, at time $t_d$, charge transfer signal TX1 may enable transistor 40 to transfer charge stored in photodiode 30 to photodiode 31, then turn off transistor 40 at time $t_d'$, which ends the transfer process.

After the transfer process, a readout process may begin. Row select signal SEL may be continuously asserted, beginning at time $t_a$, to read out charge stored at FD node 38 until the last relevant charge signal (e.g., a second image charge signal originally from PD 30) within a particular pixel is readout. Charge originally stored in photodiode 31 may be first readout from FD node 38 at time $t_a$. Reset signal RST may then be asserted at time $t_e$ to apply reset voltage Vdd to FD node 38, then deasserted at time $t_e'$. The reset voltage Vdd at FD node 38 may then be readout. Charge transfer signal TX2 may be asserted, at time $t_f$, to allow charge currently stored in photodiode 31, but originally from photodiode 30 to transfer to FD node 38. Charge originally stored in photodiode 30 may be readout from FD node 38. At time $t_f'$, transfer signal TX2 may be deasserted. Row select signal SEL may be deasserted at time $t_g$, ending the readout process for the particular pixel. The readout process may continue for subsequent pixels until all charge signals are readout from the desired pixels.

The timing diagrams shown in FIGS. 3 and 4 are merely illustrative. In general, any desired forms of operation with pixels of the type shown in FIG. 2 may be used in place of the operations shown by the timing diagrams in FIGS. 3 and 4.

Figure 5:
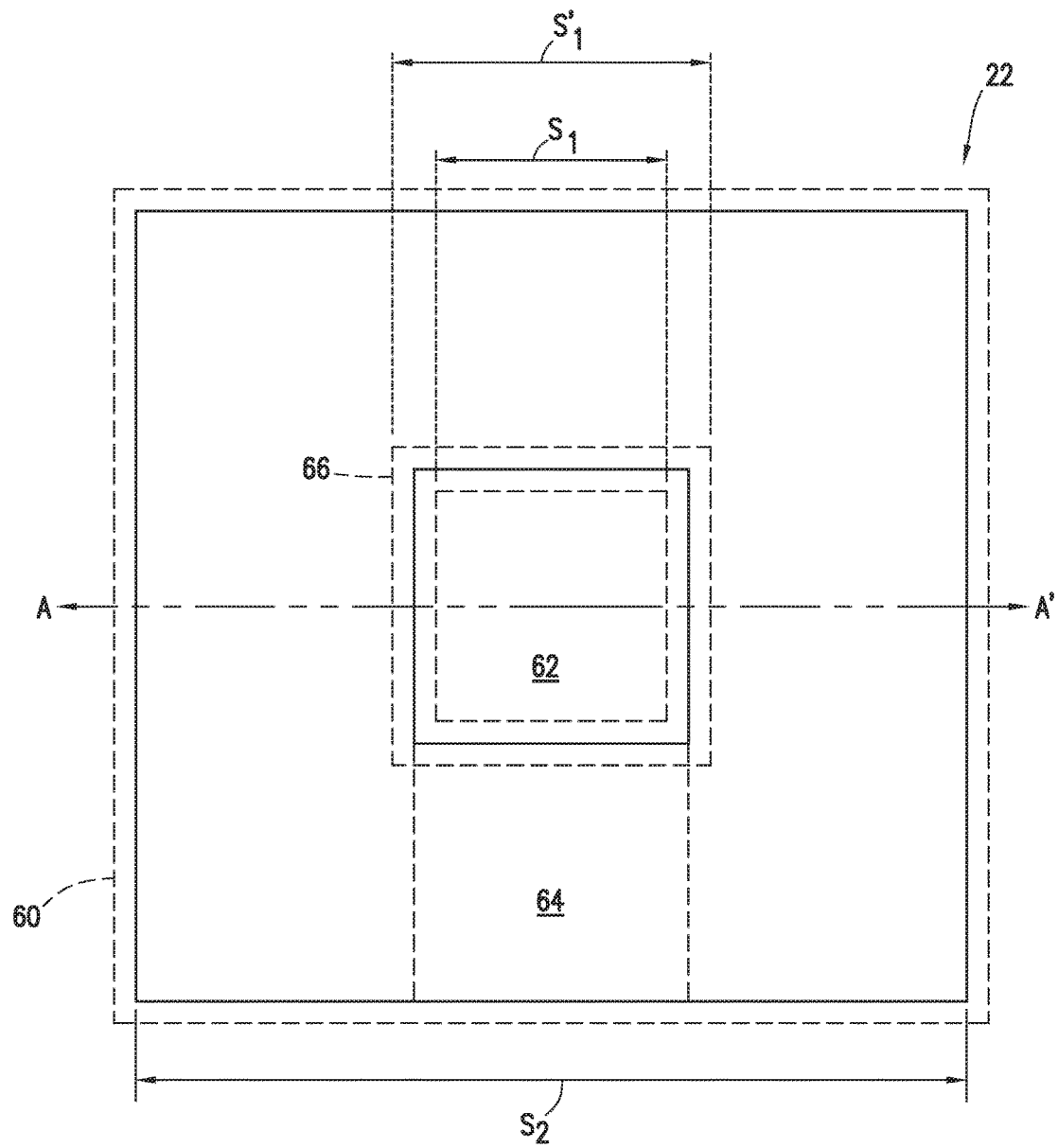
FIG. 5 is a surface view of a first side of an image sensor pixel of the type shown in FIG. 2 having nested photosensitive regions in accordance with an embodiment.

FIG. 5 is a back surface view of nested photosensitive region 60 in a pixel 22 of array 20 (e.g., FIG. 5 shows a top-down view at the back side of the semiconductor substrate in which pixels 22 is formed). Pixel 22 may include only one nested photosensitive region 60 or a multitude of nested regions. The surface view of nested photosensitive region 60 of FIG. 5 may be referred to as a diagram of the light collecting areas (LCAs) of nested photosensitive region 60. Nested photosensitive region 60 may correspond to photosensitive regions used to capture the same spectrum of light. As an example, nested photosensitive region 60 may be used to capture red, green, blue, cyan, magenta, yellow, near-infrared, infrared, or any other spectrum of light. A single red, green, blue, cyan, magenta, yellow, near-infrared, infrared, or clear color filter may be formed over nested photosensitive region 60. In certain embodiments, the color filter formed over nested photosensitive region 60 may have areas that pass colored light and other areas that are clear (i.e., that pass visible spectrum light).

Nested photosensitive regions such as region 60 shown in FIG. 5 may be included in a subset of pixels 22 of array 20, or in all of pixels 22 of array 20. As an example, nested photosensitive region 60 may include photodiodes 30 and 31 of FIG. 2. Nested photosensitive region 60 of FIG. 5 may include first photosensitive region 62, which is sometimes referred to herein as inner photosensitive region 62. Inner photosensitive region 62 may include photosensitive region 31 of a corresponding pixel 22 (sometimes referred to as inner photodiode 31). Inner photosensitive region 62 may be completely surrounded by second photosensitive region 64, which may sometimes be referred to herein as outer photosensitive region 64. Respectively, outer photosensitive region 64 may include photosensitive region 30 (sometimes referred to as outer photodiode 30) in the corresponding pixel 22. Inner photosensitive region 62 and outer photosensitive region 64 may be n-type doped photodiode regions in a semiconductor substrate. Circuitry such as transfer gates, floating diffusion regions, and reset gates of nested photosensitive region 60 may be coupled to the photodiode regions in photosensitive regions 62 and 64. The semiconductor substrate (not shown) may be a bulk p-type substrate made of silicon, or any other suitable semiconductor material.

Inner photosensitive region 62 may have a square shape at the back surface shown in FIG. 5. In other words, the light collecting area of inner photosensitive region 62 is a square region. Generally, inner photosensitive region 62 may have a rectangular light collecting area, a circular light collecting area, or any other desired shape as the light collecting area. At the surface, inner photosensitive region 62 may have width $S_1$. As an example, width $S_1$ of inner photosensitive region 62 may be 1 micron, but may alternatively be any other dimension without departing from the scope of the present embodiment. Outer photosensitive region 64 may have a square outer boundary and a square inner boundary at the surface. The area enclosed by the square outer boundary and inner boundary of outer photosensitive region 64 shown in FIG. 5 may correspond to the light collecting area of outer photosensitive region 64. The square inner boundary of outer photosensitive region 64 at the surface may be similar in shape but larger in size to the outer boundary of inner photosensitive region 62 (e.g., the square inner boundary of outer photosensitive region 64 has width $S'_1$ that is greater than width $S_1$). As shown in FIG. 5, the length of one of the sides of the outer boundary of outer photosensitive region 64 is width $S_2$. As an example, width $S_2$ may be 3 microns, but may alternatively be any other dimension without departing from the scope of the present embodiment. Width $S_2$ is preferably greater than widths $S_1$ and $S'_1$. Outer photosensitive region 64 is illustrated in FIG. 5 as having a square outer boundary, but may alternatively have a rectangular outer boundary. Similarly, the outer boundary of inner photosensitive region 62 and the inner boundary of outer photosensitive region 64 may be rectangular as well.

In between inner photosensitive region 62 and outer photosensitive region 64, isolation region 66 may be formed. Isolation region 66 may be devoid of any circuitry related to pixel 22 or its photosensitive regions 62 and 64. Isolation region 66 may separate individual photosensitive regions in a given nested photosensitive region from one another, and may also separate individual photosensitive regions in different respective nested photosensitive regions from one another. Isolation region 66 may include different types of isolation devices such as trench isolation structures, doped semiconductor regions (e.g., p-type isolation regions when regions 64 and 62 are n-type), metallic barrier structures, or any other suitable isolation device.

Inner photosensitive region 62 may have a lower sensitivity to incident light and may be referred to as having a lower sensitivity light collecting area (or more simply, size) compared to outer photosensitive region 64. The respective doping concentrations of inner photosensitive region 62 and outer photosensitive region 64 may be different or they may be the same. As an example, the doping concentrations of photodiode regions in inner photosensitive region 62 may be modified to reduce the sensitivity of inner photosensitive region 62 to light. However, for the sake of simplicity in explaining and highlighting the properties of nested photosensitive region 60, it will be assumed that photosensitive regions 62 and 64 have photodiodes with the same doping concentrations. The lower sensitivity to incident light of inner photosensitive region 62 compared to outer photosensitive region 64 may be a result of the lower light collecting area of inner photosensitive region 62 compared to the light collecting area of outer photosensitive region 64. It will be assumed for the purposes of explaining the embodiment that lower light sensitivity of inner photosensitive region 62 relative to the light sensitivity of outer photosensitive region 64 is due to the smaller size, or more specifically the smaller light collecting area, of the inner photosensitive region 62 relative to the outer photosensitive region 64.

One or more microlenses (not shown in FIG. 5) may be formed over nested photosensitive region 60 of FIG. 5 to direct light toward outer photosensitive region 64. The one or more microlenses may be formed over the color filter (not shown in FIG. 5) formed over nested photosensitive region 60. To direct light toward outer photosensitive region 64, the one or more microlenses may be formed over only outer photosensitive region 64. In some embodiments however, the one or more microlenses that direct light toward outer photosensitive region 64 may partially overlap the light collecting area of inner photosensitive region 62. Directing light toward outer photosensitive region 64 may further increase the sensitivity of the light collecting area of outer photosensitive region 64, relative to the sensitivity of the light collecting area of inner photosensitive region 62. In other words, because a larger amount of light incident on nested photosensitive region 60 is directed to outer photosensitive region 64 than to inner photosensitive region 62, inner photosensitive region 62 is said to have a lower sensitivity light collecting area compared to outer photosensitive region 64.

Figure 6:
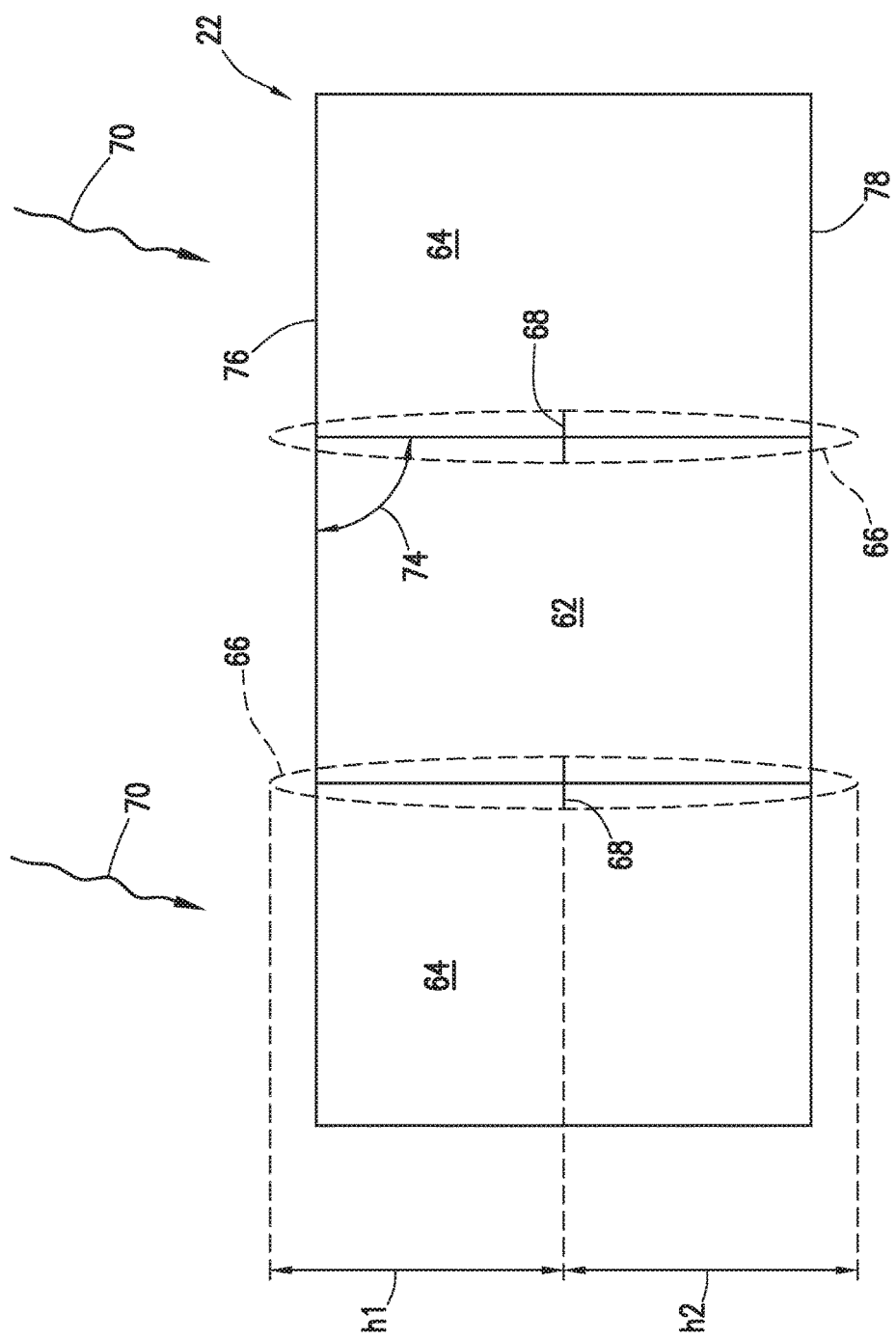
FIG. 6 is a cross-sectional side view of the nested photosensitive regions shown in FIG. 5 in accordance with an embodiment.

FIG. 6 is a cross-sectional side view of nested photosensitive region 60 along the A-A' line in FIG. 5. FIG. 6 illustrates an isolation region 66 between inner photosensitive region 62 and outer photosensitive region 64. Isolation region 66 may be perpendicular to light collecting surface 76 (e.g., the back surface shown in the plan view of FIG. 5) of nested photosensitive region 60. Surface 78 may be a surface on an opposing side of the substrate from surface 76. When isolation region 66 is perpendicular to surface 76, angle 74 between isolation region 66 and surface 76 may be 90 degrees. The length across inner photosensitive region 62 at surface 76 may be the same as the length across inner photosensitive region 62 at opposite surface 78. Alternatively, design considerations or implementation constraints in certain manufacturing processes may result in angle 74 between isolation region 66 and surface 76 being greater than or less than 90 degrees. When angle 74 is not 90 degrees, the length across inner photosensitive region 62 at surface 76 may be different from the length across inner photosensitive region 62 at surface 78.

During a light collecting interval, light 70 incident on nested photosensitive region 60 may be absorbed by inner photosensitive region 62 and outer photosensitive region 64. As described above in connection with FIG. 5, outer photosensitive region 64 has a more sensitive light collecting area compared to inner photosensitive region 62 due to at least the larger size of outer photosensitive region 64 and the one or more microlenses formed on nested photosensitive region 60 to direct charge toward outer photosensitive region 64, or equivalently, away from inner photosensitive region 62. As a result of outer photosensitive region 64 having a more sensitive light collecting area, the number of photo-generated charges in outer photosensitive region 64 after exposure to incident light 70 may be larger than the number of photo-generated charges in inner photosensitive region 62 after exposure to incident light 70.

As an example, photo-generated charges in outer photodiode 30 within outer photosensitive region 64 may leak or diffuse across isolation region 66 and into inner photodiode 31 (not shown) within inner photosensitive region 62. Isolation region 66 may have first and second regions separated by boundary 68. Isolation devices used in isolation region 66 may include isolation structures of various types, such as trench isolation structures, doped semiconductor regions, and metallic barriers, which may be formed in one or both of the first and second regions of isolation region 66. When the same type of isolation device is formed in both the first and second regions of isolation region 66 (e.g., when a single isolation device type is formed in isolation region 66) the isolation device in region 66 may be continuous. When the type of isolation device in a first region of isolation region 66 having a height h1 is different from the type of isolation device in a second region of isolation region 66 having a height h2, the isolation devices in region 66 may be discontinuous for the depth of photodiodes in nested photosensitive region 64.

The leaking of charge from one photodiode region of a photosensitive region into another photodiode region of another photosensitive region is generally referred to as electrical cross-talk. Because a single color filter is formed over nested photosensitive region 60, inner photosensitive region 62 and outer photosensitive region 64 may receive incident light 70 of the same color. As a result, photo-generated charge that diffuses or leaks from outer photodiode 30 across isolation region 66 into inner photosensitive region 62 may correspond to charge produced in response to the same color that produced photo-generated charges in inner photodiode 31. The electrical cross talk between photodiode regions in photosensitive regions 62 and 64 is therefore cross-talk between photodiodes receiving light of the same color, and is therefore manageable. The electrical cross talk between photodiodes in photosensitive regions 62 and 64 may be accounted for or managed during readout of the pixel 22 in which nested photosensitive region 60 are located, or after the readout of the pixel 22 in which the nested photosensitive region 60 are located.

The area of the isolation region 66 interface across which charges leak or diffuse from outer photosensitive region 64 to inner photosensitive region 62 may be dependent on angle 74 between isolation region 66 and surface 76. When angle 74 is less than or greater than 90 degrees, the area of surface 76 is increased, which increases the amount of electrical cross talk between photosensitive regions 62 and 64, because the area over which photo-generated charges can diffuse (i.e., the interface area of isolation region 306) is increased.

As shown in the cross-section view of FIG. 6, inner photosensitive region 62 and outer photosensitive region 64 may have the same depth. In a further example, inner photosensitive region 62 may have a different depth than outer photosensitive region 64. For example, inner photosensitive region 62 may be shallower than outer photosensitive region 64, such that inner photosensitive region 62 extends to a shallower depth than photosensitive region 64. In a different example, outer photosensitive region 64 may be shallower than inner sensitive region 62. The depths of the photosensitive regions 62 and 64 may affect the charge storage capacities of the respective regions. Any desired depths of photosensitive region 62 and 64 may be implemented to reflect a structure of the photosensitive regions with desired storage capabilities and other desired features.

Figure 7:
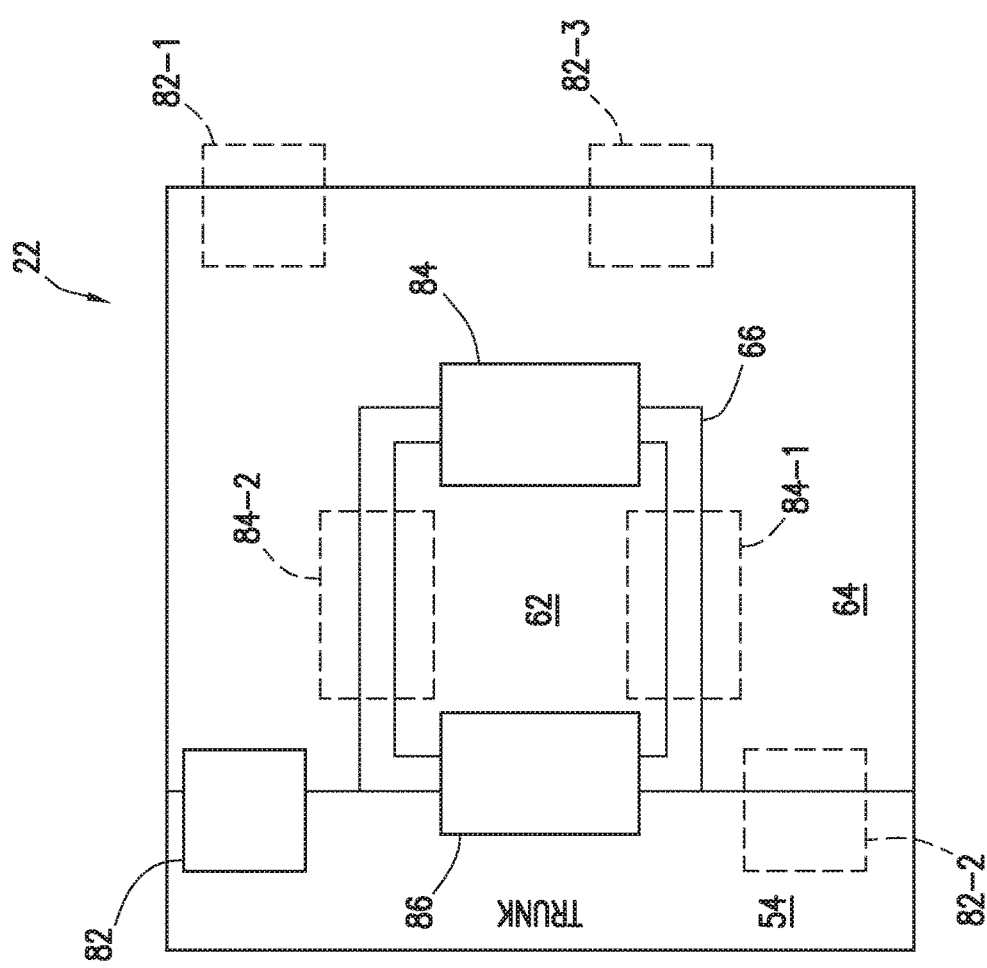
FIG. 7 is a surface view of a second side of the image sensor pixel having nested photosensitive regions as shown in FIG. 5 in accordance with an embodiment.

FIG. 7 is a front surface view of nested photosensitive region 60 and trunk 54 in a pixel 22 of array 20, corresponding to the back surface view of FIG. 5 (e.g., FIG. 7 shows a front surface of the substrate in which pixel 22 is formed whereas FIG. 5 shows an opposing back surface). Pixel 22 may include one or more nested photosensitive regions 60. Each nested photosensitive region 60 may include an outer photosensitive region 64, an inner photosensitive region 62, and an isolation region 66 similar to the configuration shown in FIG. 5. Pixel 22 may additionally include trunk 54 (e.g., readout circuitry), transistor 82, transistor 84, and transistor 86. Trunk 54 may replace a side of outer photosensitive region 64 at the front surface (e.g., whereas trunk 54 is not present at the opposing back surface). A first isolation structure may be interposed between a side of trunk 54 and the side of outer photosensitive region 64 that opposes the side of trunk 54. A second isolation structure (e.g., isolation structure 66) may be interposed between the side of trunk 54 and the side of inner photosensitive region 64 that opposes the side of trunk 54. The first isolation structure may be integral with the second isolation structure or formed independently. Generally, trunk 54 may be formed proximally near both outer photosensitive region 64 and inner photosensitive region 62, but separated from regions 62 and 64 by isolation structures.

Transistor 82 may couple outer photosensitive region 64 to trunk 54. More specifically, transistor 82 may be an anti-blooming transistor (e.g. transistor 34 in FIG. 2). Outer photosensitive region 64 may be a charge storage well (e.g., outer photodiode 30). Anti-blooming transistor 82 may couple outer photosensitive region 64 to a voltage source within trunk 54. When a control signal for transistor 82 (e.g., control signal AB in FIG. 2) is asserted, a supply voltage from the power source within trunk 54 is applied to photosensitive region 64 though transistor 82.

Transistor 82 may have a first portion (e.g., either a source or drain terminal) adjacent to (e.g., directly above) outer photosensitive region 64 and a second portion (e.g., the opposite terminal of the first portion) adjacent to (e.g., directly above) trunk 54. Additionally, transistor 82 may be formed over an isolation structure (e.g., isolation structure interposing outer photosensitive region 64 and trunk 54) between the first and second portions. Transistor 82 may be formed at its current location or at location 82-2 as shown in FIG. 7, for example. In this scenario, transistor 82 may be coupled between trunk 54 and outer photosensitive region 64, where trunk 54 and outer photosensitive region 64 are both part of the same pixel. If desired, transistor 82 may be formed at any location where it couples trunk 54 to outer photosensitive region 64.

If desired, transistor 82 may be coupled between any desired trunk (e.g., trunk circuitry of an adjacent pixel) and a side of outer photosensitive region 64. As an example, transistor 82 may be formed at one of locations 82-1 or 82-3, or any other location on the side of region 64 to couple region 64 to the trunk circuitry of an adjacent pixel. In this scenario, transistor 82 may transfer charge between region 64 and the trunk circuitry of the adjacent pixel. The adjacent pixel may include multiple photosensitive regions such as photosensitive region 62 nested within outer photosensitive region 64 as shown in FIG. 7.

Transistor 84 may be formed over isolation region 66 to couple outer photosensitive region 64 to inner photosensitive region 62. For example, transistor 84 may bridge the isolation region at a surface of the substrate and may have a first source/drain terminal coupled to region 64 and a second source/drain terminal coupled to region 62. Transistor 84 may, for example, be a charge transfer transistor such as transistor 40 of FIG. 2. When a control signal (e.g., TX1 in FIG. 2) for transistor 84 is asserted, charge stored in outer photosensitive region 64 may flow into inner photosensitive region 62 through transistor 84. Inner photosensitive region 62 may be a charge storage well (e.g., inner photodiode 31). Transistor 84 may be formed at its current location as shown in FIG. 7, as an example. Generally, transistor 84 may bridge any desired portion of isolation region 66 as to couple outer photosensitive region 64 to inner photosensitive region 62. If desired, transistor 84 may be formed at location 84-1 or 84-2.

Transistor 86 may be formed over isolation region 66 to couple inner photosensitive region 62 to trunk 54. For example, transistor 86 may bridge the isolation region at a surface of the substrate and may have a first source/drain terminal coupled to region 62 and a second source/drain terminal coupled to trunk 54. More specifically, transistor 86 may be a charge transfer transistor (e.g., transistor 42 in FIG. 2). Trunk 54 may include a floating diffusion node (e.g., FD node 38 in FIG. 2). Charge transfer transistor 86 may couple inner photodiode 31 to the floating diffusion node. When a control signal (e.g., TX2 in FIG. 2) for transistor 86 is asserted, charge stored in inner photosensitive region 62 may flow to the floating diffusion node within trunk 54 through transistor 86. Transistor 86 may be formed at its current location as shown in FIG. 7, as an example. Generally, transistor 86 may bridge any desired portion of isolation region 66 as to couple inner photosensitive region 62 to trunk 54.

Figure 8:
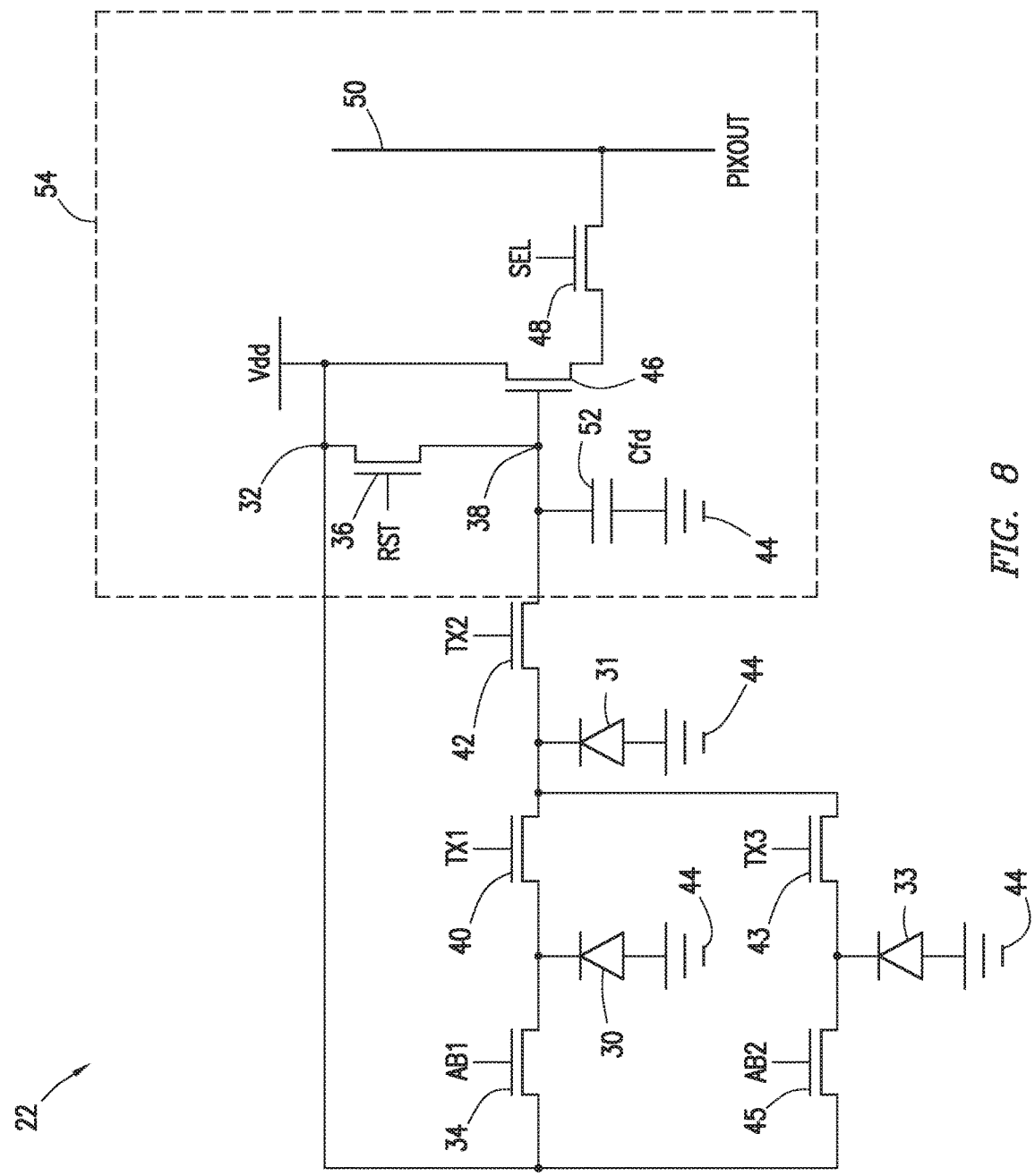
FIG. 8 is a circuit diagram of an illustrative image sensor pixel having multiple photosensitive regions in accordance with an embodiment.

In an alternative embodiment, pixel 22 shown in FIG. 2 may include additional photosensitive region 33 (e.g., photodiode 33), as shown in FIG. 8. Anti-blooming transistor 45 may couple photodiode 33 to positive voltage supply terminal 32. Transfer transistor 43 may couple photodiode 33 to photodiode 44. Pixel 22 in FIG. 8 may operate in a similar way as described in FIG. 2. Features not mentioned in FIG. 8 may be formed in a similar configuration as in FIG. 2. Additionally, photodiode 33 may also generate charge in response to incident light. The generated charge may be transferred to photodiode 31 for temporary storage before being read out. Pixel 22 in FIG. 8 may be operable in either rolling shutter or global shutter mode. Photodiodes 30, 31, and 33 may form nested photosensitive region 69.

Figure 9:
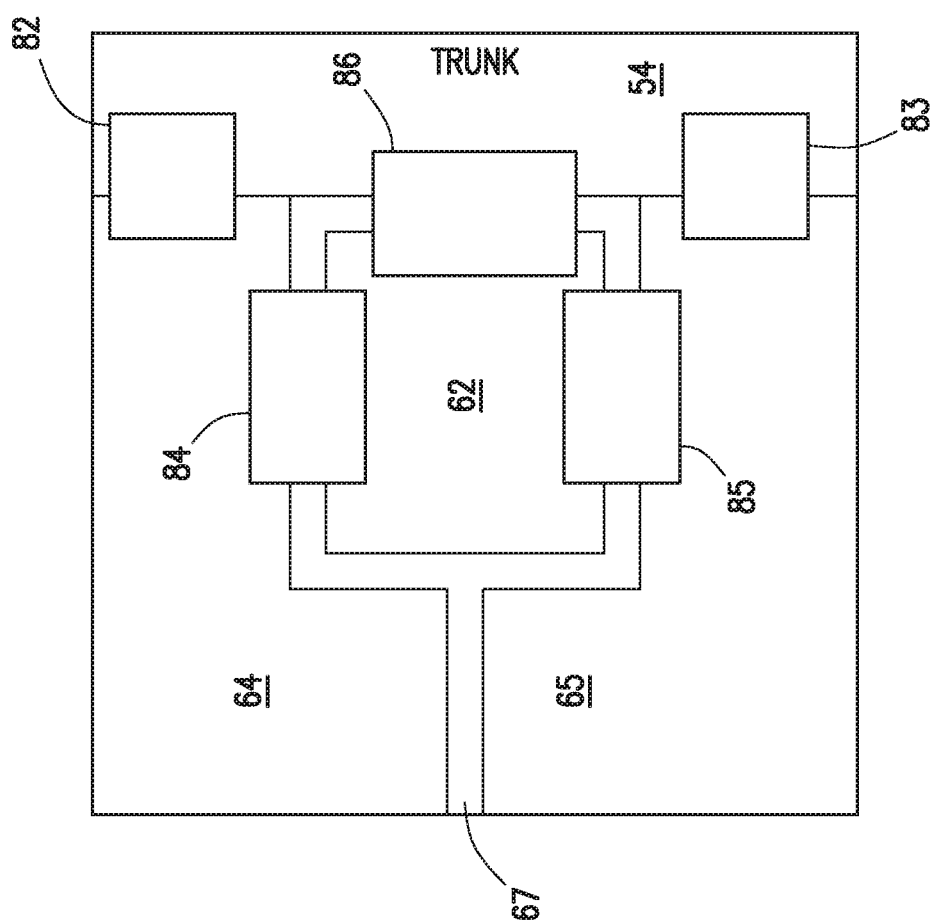
FIG. 9 is a surface view of a side of an image sensor pixel of the type shown in FIG. 8 having nested photosensitive regions in accordance with an embodiment.

FIG. 9 is a back surface view implementing the addition of photodiode 33, anti-blooming transistor 45, and transfer transistor 43 shown in FIG. 8 to FIG. 7. In other words, FIG. 9 is a back surface view of nested photosensitive region 69 in pixel 22 as shown in FIG. 8. The structure and operation of structures within pixel 22 that were previously described features remain the same in FIG. 9 as in FIG. 7. Additionally, nested photosensitive region 69 may include outer photosensitive regions 64 and 65, corresponding to photodiodes 30 and 33, respectively. Outer photosensitive regions 64 and 65 may surround inner photosensitive region 62 (corresponding to photodiode 31). Isolation structure 67 may be interposed between a portion of outer photosensitive region 64 and a portion of outer photosensitive region 65. Isolation structure 67 may be integral with an analogous portion of isolation structure 66 as shown in FIG. 7 that is interposed between inner photosensitive region 62 and outer photosensitive region 64 and 65. In a further example, the portion of isolation structure 66 as shown in FIGS. 7 and 67 may be formed at different steps.

Transistor 83 may have a first portion (e.g., either a source or drain terminal) adjacent to (e.g., directly above) outer photosensitive region 65 and a second portion (e.g., the opposite terminal of the first portion) adjacent to (e.g., directly above) trunk 54. Additionally, transistor 83 may be formed over an isolation structure (e.g., isolation structure interposing outer photosensitive region 65 and trunk 54) between the first and second portions. In this scenario, transistor 83 may be coupled between trunk 54 and outer photosensitive region 65, where trunk 54 and outer photosensitive region 65 are both part of the same pixel. If desired, transistor 83 may be formed at any location where it couples trunk 54 to outer photosensitive region 65.

If desired, transistor 83 may be coupled between any desired trunk (e.g., trunk circuitry of an adjacent pixel) and a side of outer photosensitive region 65. As an example, transistor 83 may be formed at any other location on the side of region 65 to couple region 65 to the trunk circuitry of an adjacent pixel. In this scenario, transistor 83 may transfer charge between region 64 and the trunk circuitry of the adjacent pixel. The adjacent pixel may include multiple photosensitive regions such as photosensitive region 62 nested within outer photosensitive region 64 as shown in FIG. 7.

Transistor 85 may be formed over isolation region 66 to couple outer photosensitive region 65 to inner photosensitive region 62. For example, transistor 85 may bridge the isolation region at a surface of the substrate and may have a first source/drain terminal coupled to region 65 and a second source/drain terminal coupled to region 62. Transistor 85 may, for example, be a charge transfer transistor such as transistor 43 of FIG. 8. When a control signal (e.g., TX3 in FIG. 8) for transistor 85 is asserted, charge stored in outer photosensitive region 65 may flow into inner photosensitive region 62 through transistor 85. Inner photosensitive region 62 may be a charge storage well (e.g., inner photodiode 31). Transistor 85 may be formed at its current location as shown in FIG. 9, as an example. Generally, transistor 85 may bridge any desired portion of isolation region 66 as to couple outer photosensitive region 65 to inner photosensitive region 62.

Figure 10:
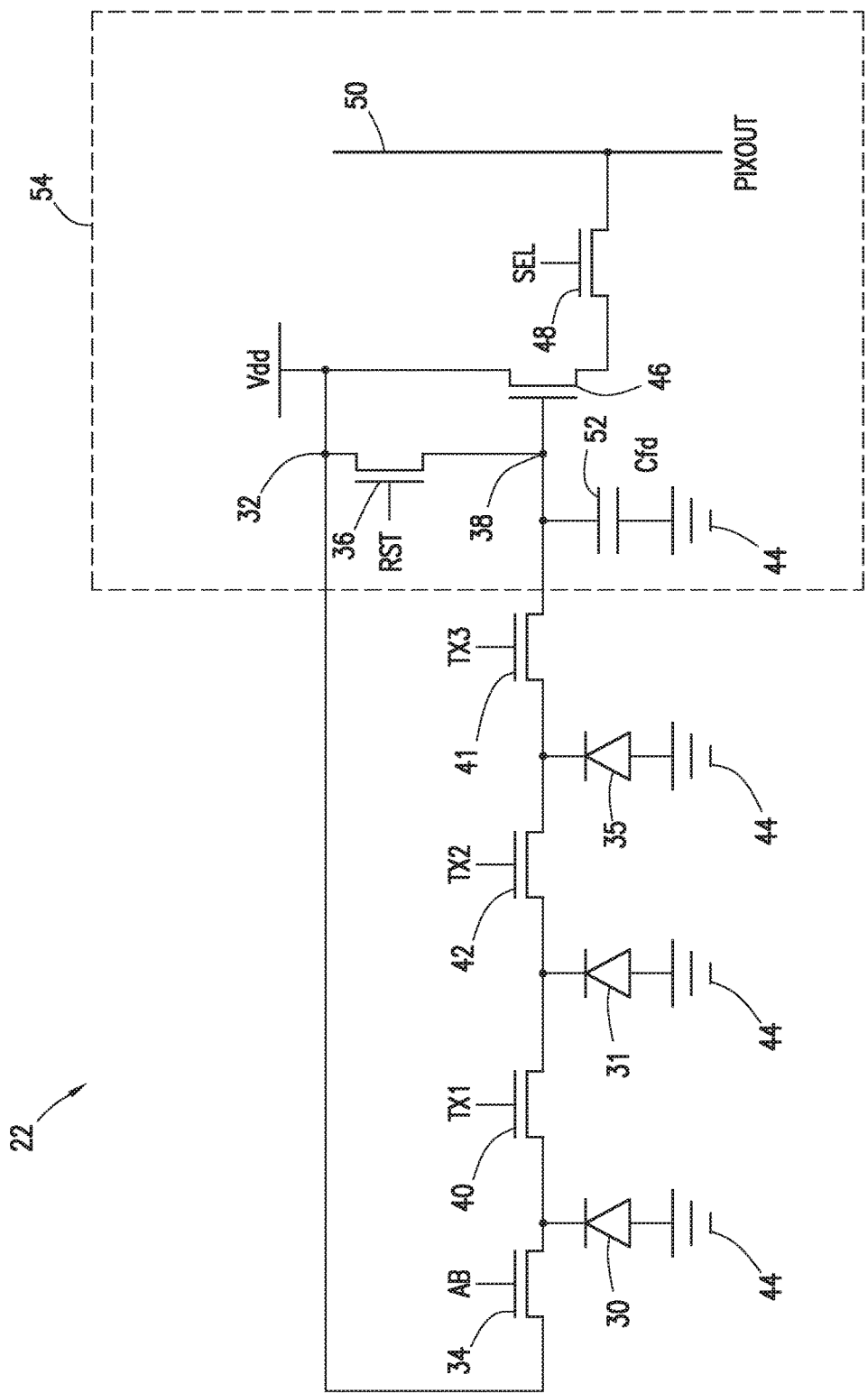
FIG. 10 is a circuitry diagram of an illustrative image sensor pixel having multiple photosensitive regions in accordance with an embodiment.

In an alternative embodiment, pixel 22 shown in FIG. 2 may include additional photosensitive region 35 (e.g., photodiode 35), as shown in FIG. 10. Transfer transistor may couple photodiode 31 to photodiode 35. Transfer transistor 41 may couple photodiode 33 to floating diffusion region 38. Pixel 22 in FIG. 10 may operate in a similar way as described in FIG. 2. Features not mentioned in FIG. 10 may be formed in a similar configuration as in FIG. 2. Additionally, photodiode 35 may also generate charge in response to incident light. Photodiode 35 may also serve as a storage diode to temporarily store generated charge from photodiodes 30 and 31. The stored charge in photodiode 35 may be transferred to floating diffusion region 38 before being read out. Pixel 22 in FIG. 10 may be operable in either rolling shutter or global shutter mode. Photodiodes 30, 31, and 33 also may form a nested photosensitive region.

Generally, an isolation structure may be formed between any two adjacent photosensitive regions. However, in FIGS. 11-15, the isolation structures are not illustrated or discussed in further detail, in order to avoid unnecessarily obscuring the present embodiments and the drawings of FIGS. 11-15.

Figure 11:
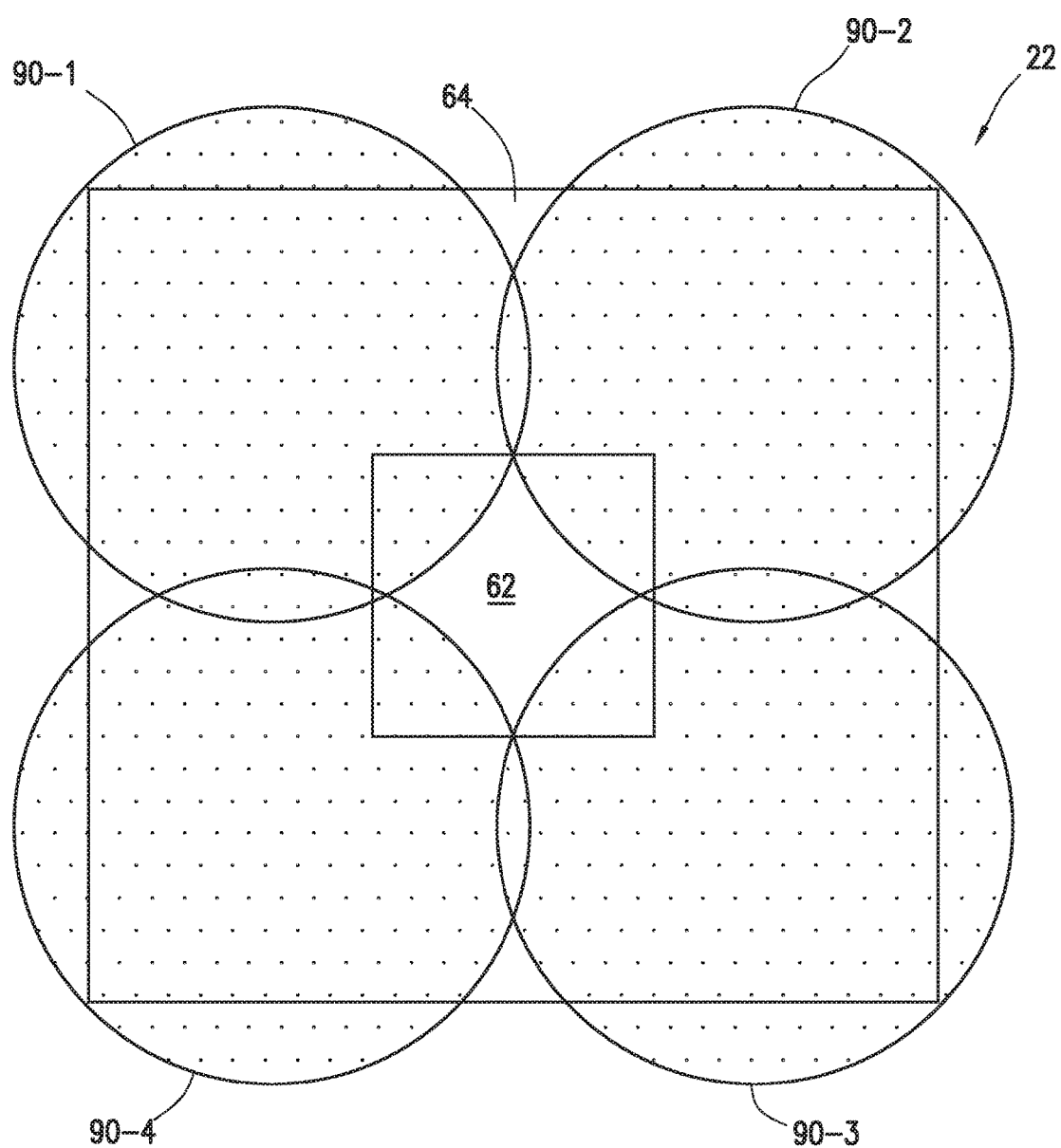
FIG. 11 is a diagram of illustrative circular microlens placement over nested photosensitive regions in accordance with an embodiment.

Microlenses may be formed over photosensitive regions to focus incident light to the photosensitive region. FIG. 11 illustrates the placement of circular microlenses over nested photosensitive region 60 in pixel 22 of array 20. Although inner photosensitive region 62 and outer photosensitive region 64 of FIG. 11 are illustrated in accordance with the embodiment of FIG. 5, the placement of circular microlenses 90 above the back surface in FIG. 5 may be used in conjunction with any photosensitive region configurations of the various shapes previously mentioned. Although microlenses may be formed over the back surface in a backside illuminated configuration, generally microlenses may be formed over any light receiving area (e.g., the front surface in FIG. 7 in a frontside illuminated configuration). Circular microlenses 90 may be centered outside the boundary of inner photosensitive region 62. Microlenses 90 may be centered over regions of the outer photosensitive region 64. FIG. 11 illustrates four microlenses 90-1, 90-2, 90-3, and 90-4 per pixel. The placement of microlenses 90 over nested photosensitive region 60 may direct light to only outer photosensitive region 64. The placement of microlenses 90 as illustrated in FIG. 11 may increase the sensitivity of the light collecting area of outer photosensitive region 64 relative to an arrangement in which microlenses 90 are not formed at all. As shown in FIG. 11, microlenses 90 may partially overlap inner photosensitive region 62. However, increase in sensitivity for the light collecting area of inner photosensitive region 62 caused by microlenses 90 partially overlapping inner photosensitive region 62 may be negligible.

FIG. 11 illustrates microlenses 90 extending beyond outer photosensitive region 64. However, the extension of microlenses 90 beyond outer photosensitive region 64 may correspond to an intermediate step in the fabrication of microlenses 90.

Figure 12A:
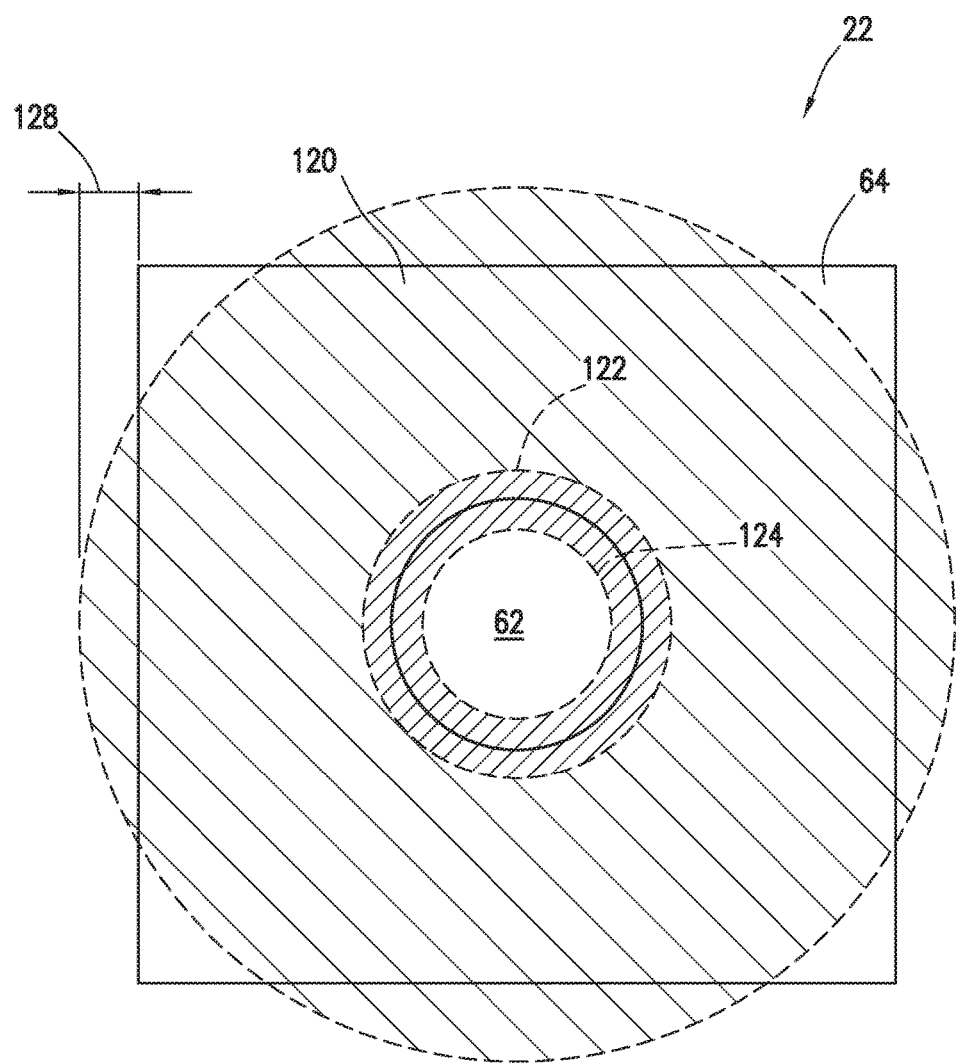
FIGS. 12A and 12B are diagrams of illustrative toroidal microlens placements over nested photosensitive regions in accordance with an embodiment.

If desired, a toroidal microlens may be formed over pixel 22. FIG. 12A illustrates the placement of a toroidal microlens over nested photosensitive region 60 in a pixel 22 of array 20. Although inner photosensitive region 62 and outer photosensitive region 64 of FIG. 12A are illustrated in accordance with an embodiment of nested photosensitive region 60 of FIG. 5 with inner photosensitive region 62 having a circular shape, toroidal microlens 120 may be used in conjunction with any of the photosensitive region configurations (e.g., rectangular configuration in FIG. 5). In other words, toroidal microlens 120 may be used in conjunction with pixels having multiple nested photosensitive regions surrounding an inner photosensitive region having a circular, elliptical, square, or rectangular surface. Pixels 22 that include one, two, or any number of photosensitive regions that surround an inner photosensitive region having a circular, elliptical, square, or rectangular surface may include toroidal microlens 120.

FIG. 12A illustrates a toroidal microlens 120, which may have either a first inner boundary 122 or a second inner boundary 124. In certain embodiments where toroidal microlens 840 has the first inner boundary 122, toroidal microlens may not overlap inner photosensitive region 62. In other words, toroidal microlens 120 with inner boundary 122 may be formed over only outer photosensitive region 64. In other embodiments, where toroidal microlens 120 has second inner boundary 124, toroidal microlens 120 may partially overlap inner photosensitive region 62. When toroidal microlens 120 only overlaps outer photosensitive region 64 (i.e., when toroidal microlens 120 has the second inner boundary 124), toroidal microlens 120 may direct light to outer photosensitive region 64 without directing any light to inner photosensitive region 62. However, microlens 120 may alternatively overlap inner photosensitive region 62, at least partially (i.e., when toroidal microlens 120 has the first inner boundary 122), so that the light (i.e., photons) incident on the portion of microlens 120 that at least partially overlaps inner photosensitive region 62 may be re-directed toward outer photosensitive region 64 by toroidal microlens 120. Because toroidal microlens 120 only directs light to outer photosensitive region 64, the sensitivity of the light collecting area of outer photosensitive region 64 may be increased. The sensitivity of the light collecting area of outer photosensitive region 64 may be greater than the sensitivity of the light collecting area of inner photosensitive region 62.

Toroidal microlens 120 of FIG. 12A is shown to extend beyond the outer boundary of outer photosensitive region 64 (namely, in region 128 beyond outer photosensitive region 64). As an example, a portion of toroidal microlens 120 is shown to be formed in region 128 that extends beyond the outer boundary of outer photosensitive region 64. When multiple nested photosensitive regions 60 are placed in an array, toroidal microlenses 120 of adjacent nested photosensitive regions 60 may overlap as a result of toroidal microlens 120 extending beyond the outer boundary of outer photosensitive region 64.

However, the extension of toroidal microlens 120 beyond the outer boundary of outer photosensitive region 64 may, in a finished device, be unnoticeable or even absent, as the extension of microlens 120 beyond the boundary of an outermost photosensitive region (outer photosensitive region 64, in this example) may be relevant to pixels that have been processed only up to an intermediate lithography step, specifically, to an intermediate lithography step before a re-flow process has been applied to pixels and their associated microlenses. After the re-flow process has been applied to the pixels, any extension of a microlens beyond the outer boundary may be reduced or eliminated, as illustrated in FIG. 12B, where the microlenses 121-1 and 121-2 do not extend beyond the outer boundary of the respective outer photosensitive region 64 over which they are respectively formed.

Figure 12B:
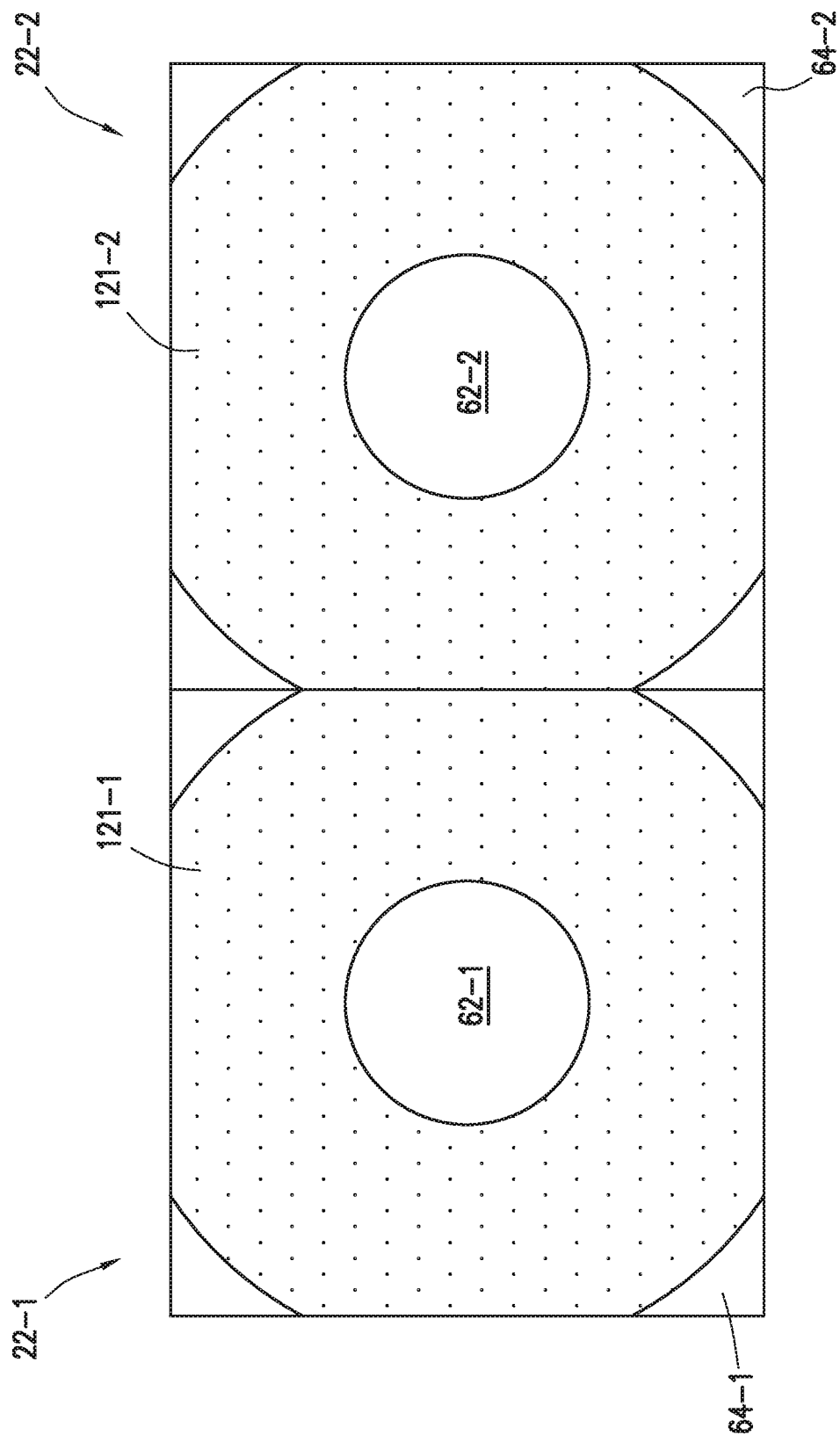

FIG. 12B illustrates toroidal microlens 121-1 formed over a given pixel (such as pixel 22 of FIG. 1) having inner photosensitive region 62-1 that is nested within outer photosensitive region 64-1. As described in connection with FIG. 12A, toroidal microlens 121 of FIG. 12B is illustrated in accordance with the embodiment of nested photosensitive region 60 of FIG. 5 with inner photosensitive region 62 having a circular shape, though toroidal microlens 121 may be used in conjunction with any of the photosensitive region configurations (e.g., rectangular configuration in FIG. 5). In other words, toroidal microlens 121 may be used in conjunction with pixels having multiple nested photosensitive regions surrounding an inner photosensitive region having a circular, elliptical, square, or rectangular surface. Pixels 22 that include one, two, or any number of photosensitive regions that surround an inner photosensitive region having a circular, elliptical, square, or rectangular surface may include toroidal microlens 121.

Toroidal microlens 121-1 may be adjacent to but non-overlapping with another toroidal mircolens 121-2 formed over another pixel having an inner photosensitive region 62-2 that is nested within outer photosensitive region 64-2 and that is adjacent to the given pixel. Toroidal microlenses 121 of adjacent nested photosensitive region 60 may be directly adjacent and may contact each other at an interface. However, each of the toroidal microlenses 121 associated with a given pixel 22 having nested photosensitive region 60 may be contained within the outer boundary of the outermost photosensitive region, such as outer photosensitive region 64, as illustrated in FIG. 12B.

Figure 13:
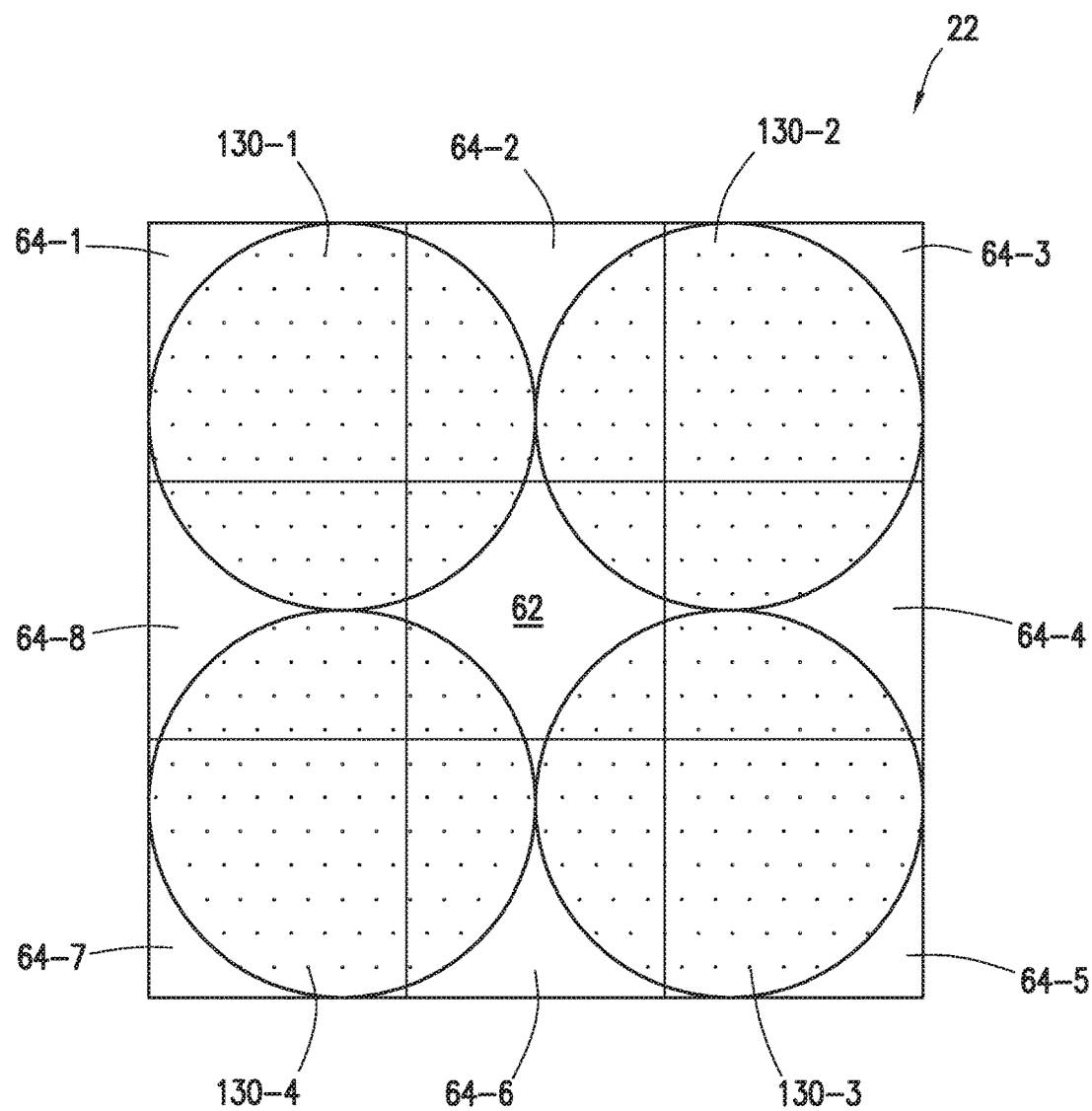
FIG. 13 is a diagram of microlens placement over nested photosensitive regions having an inner photosensitive region and an outer photosensitive region arranged in a grid layout, in accordance with an embodiment.

FIG. 13 illustrates the placement of circular microlenses over nested photosensitive region 60 in a pixel 22 of array 20. Nested photosensitive region 60 is illustrated as having a 3 by 3 array of square image sub-regions. Eight square photosensitive sub-regions 64 on the periphery of nested photosensitive region 60 may be considered an outer photosensitive region (e.g., outer photosensitive region 64) that surrounds inner photosensitive region 62. Viewed in this way, pixel 60 having nested photosensitive regions may be seen as a variant of the FIG. 5 embodiment in which outer photosensitive region 64 has been divided into eight sections, or into photosensitive sub-regions 64-1, 64-2, 64-3, 64-4, 64-5, 64-6, 64-7, and 64-8. Sub-regions 64-1, 64-2, 64-3, 64-4, 64-5, 64-6, 64-7, and 64-8 may collectively be referred to as outer photosensitive region 64. The placement of circular microlenses 130 may be similar to the placement of circular microlenses 90 over nested photosensitive region 60, except that as shown in FIG. 13, circular microlenses 130 do not extend beyond the boundary of nested photosensitive region 64. Four circular microlenses 130-1, 130-2, 130-3, and 130-4 may each be centered over a region in one of the sub-regions.

The placement of microlenses 130 over nested photosensitive region 60 may direct light to outer photosensitive region 64. The placement of microlenses 130 as illustrated in FIG. 13 may increase the sensitivity of the light collecting area of outer photosensitive region 64 relative to an arrangement in which microlenses 130 are not formed at all. As shown in FIG. 13, microlenses 130 may partially overlap inner photosensitive region 62.

Figure 14A:
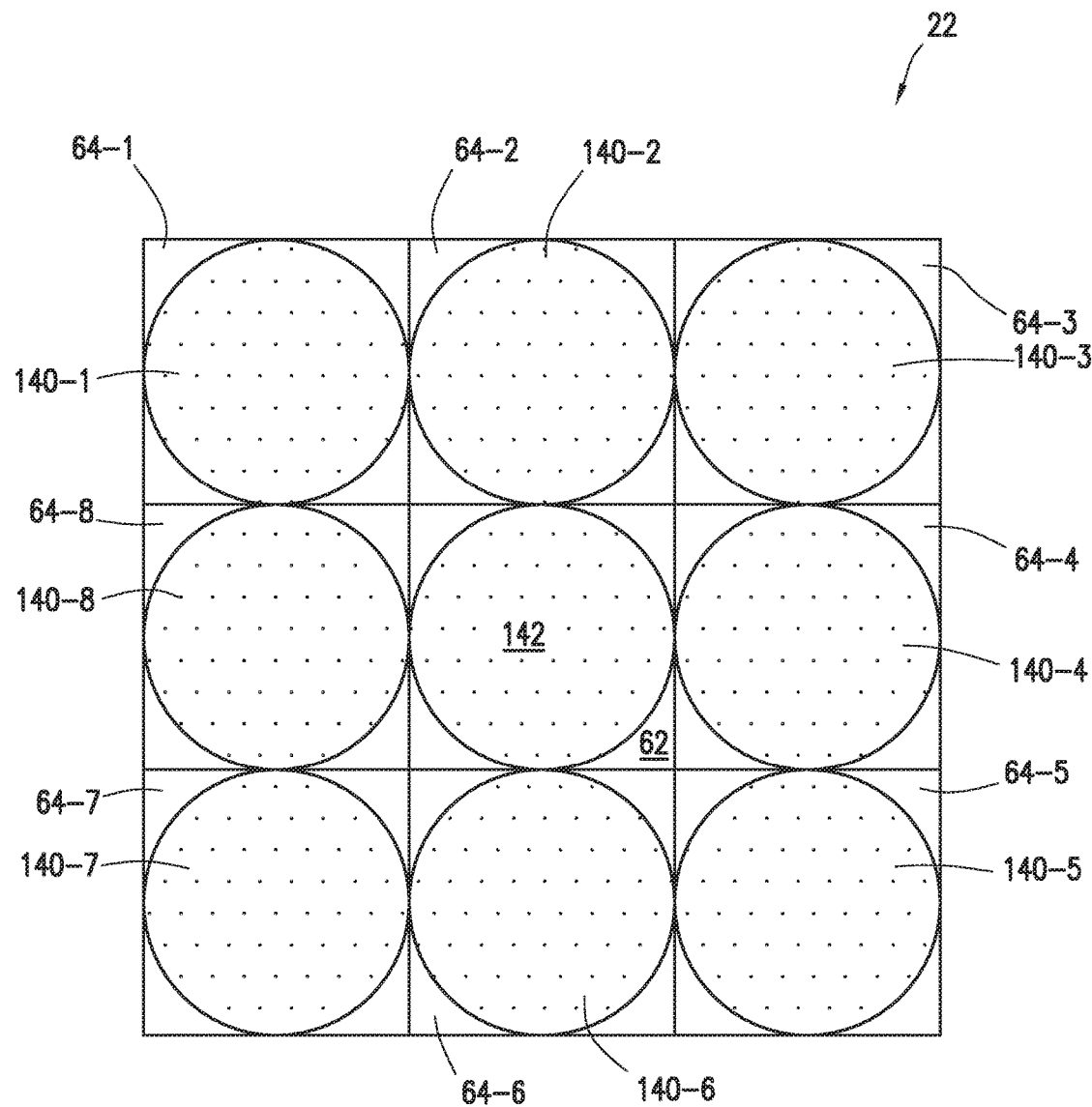
FIGS. 14A and 14B are diagrams of illustrative microlens placements over each photosensitive region of an inner photosensitive region and an outer photosensitive region arranged in a grid layout in accordance with an embodiment.
Figure 14B:
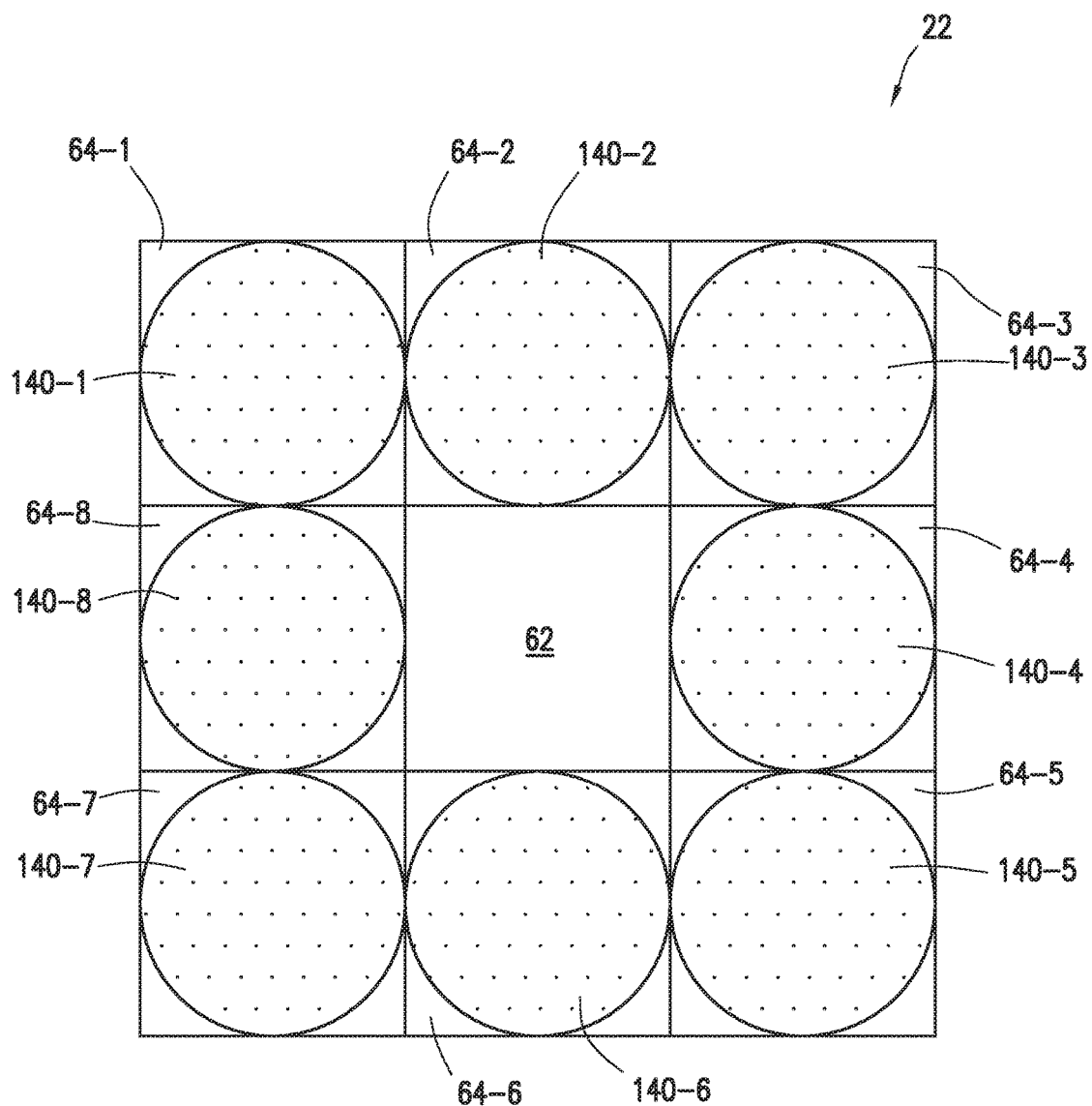

FIG. 14A illustrates the placement of circular microlenses over nested photosensitive region 60. The nested photosensitive region 60 is illustrated as having a 3 by 3 array of square image sub-regions. Eight square photosensitive sub-region 64 on the periphery of nested photosensitive region 60 may be considered an outer photosensitive region (e.g., photosensitive region 64) that surrounds inner photosensitive region 62. Generally, the sub-region in outer photosensitive region 64 need may not be square, but may still be equally sized. The sub-region in outer photosensitive region 64 may each have the same dimensions as inner photosensitive sub-region 62. Viewed in this way, the pixel 60 having nested photosensitive regions may be seen as a variant of the FIG. 5 embodiment in which the outer photosensitive sub-regions 64 has been divided into eight sections, or into photosensitive sub-regions 64-1, 64-2, 64-3, 64-4, 64-5, 64-6, 64-7, and 64-8. Photosensitive sub-regions 64-1, 64-2, 64-3, 64-4, 64-5, 64-6, 64-7, and 64-8 may collectively be referred to as outer photosensitive region 64. The placement of circular microlenses 140 may correspond to a one-to-one placement of microlenses for each photosensitive sub-region. Microlenses 140-1, 140-2, 140-3, 140-4, 140-5, 140-6, 140-7, and 140-8 may be respectively formed over photosensitive sub-regions 64-1, 64-2, 64-3, 64-4, 64-5, 64-6, 64-7, and 64-8 in outer photosensitive region 64.

The placement of microlenses 140 over the sub-regions in outer group 64 may direct light to outer photosensitive region 64. Specifically, each microlens 140 may direct light to only the respective sub-region in outer photosensitive region 64 over which it is formed. The placement of microlenses 140 as illustrated in FIG. 13A may increase the sensitivity of the light collecting area of outer photosensitive region 64 relative to an arrangement in which microlenses 140 are not formed at all. As shown in FIG. 13A, circular microlens 142 may be formed over inner photosensitive region 62. Microlens 142 may be optimized to prevent the sensitivity of the light collecting area of inner photosensitive region 62 from increasing. However, in certain embodiments such as the pixel 60 illustrated in FIG. 14B, microlens 142 is omitted to avoid increasing the sensitivity for the light collecting area of inner photosensitive region 62. In certain embodiments, instead of an individual microlens 140 being provided for each sub-region of outer photosensitive sub-regions group 64, a toroidal microlens 120 of FIG. 12A or a toroidal microlens 121 of FIG. 12B may be formed over the sub-regions of outer photosensitive region 64.

Figure 15A:
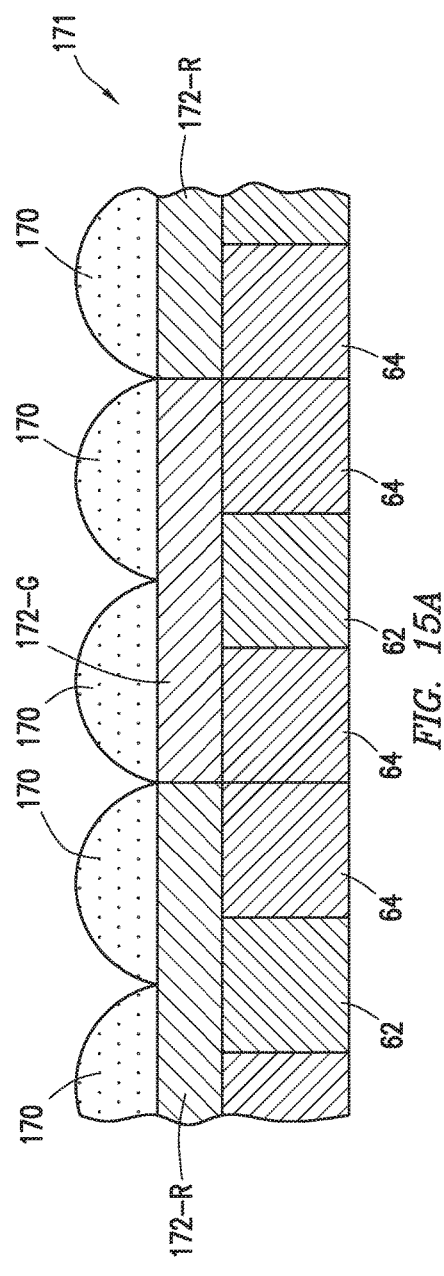
FIGS. 15A and 15B are diagrams showing how illustrative microlenses may be formed adjacent to one another in accordance with an embodiment.
Figure 15B:
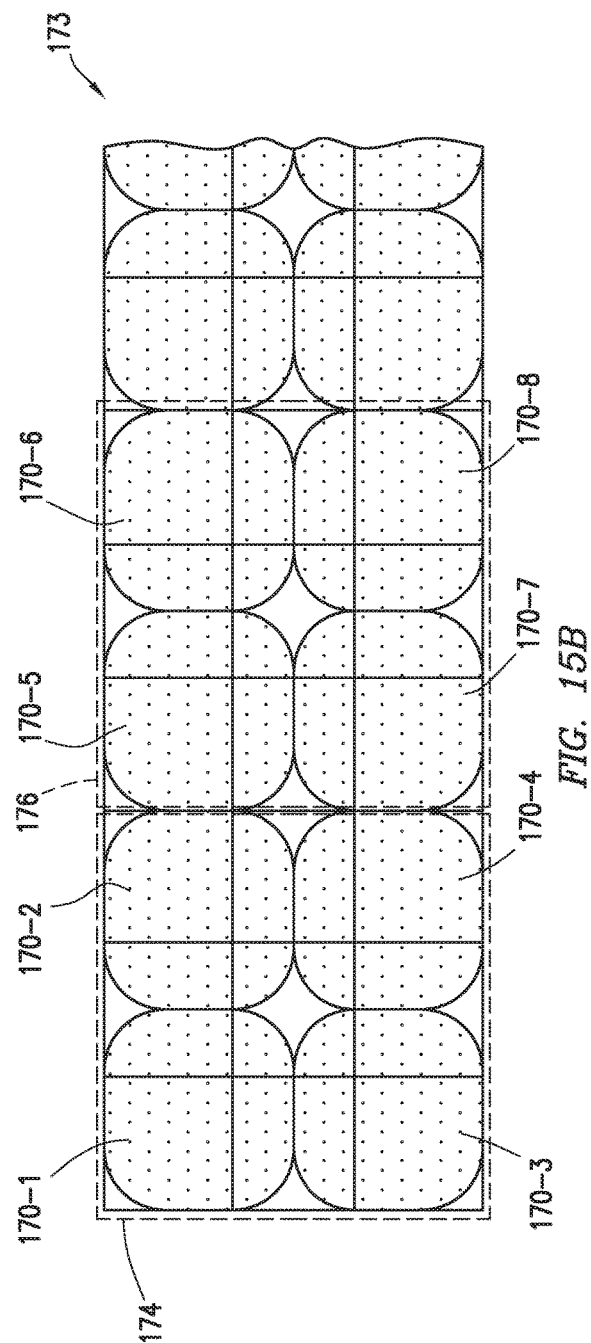

FIG. 15A illustrates side view 171 of microlenses 170 formed over a structure 3-by-3 array of photosensitive regions 62 and 64, where photosensitive region 64 forms an outer photosensitive region, and where photosensitive region 62 forms an inner photosensitive region that is nested within the outer photosensitive region. Microlenses 170 in FIG. 15A do not overlap one another, but are adjacent to one another. Microlenses 170 do not overlap one another within a pixel 174 or 176, or between pixels 174 and 176. Microlenses 170 may be formed over color filters such as red color filter 172-R, green color filter 172-G, a blue color filter (not pictured), a clear filter (not pictured), or any other suitable color filter or hybrid color filter that includes clear regions and color filter regions. Plan view 173 of FIG. 15B shows that between microlenses 170, gaps may be present. These gaps may be eliminated, or the size and shapes of these gaps may modified based on the method of disposing and forming microlenses 170.

Figure 16A:
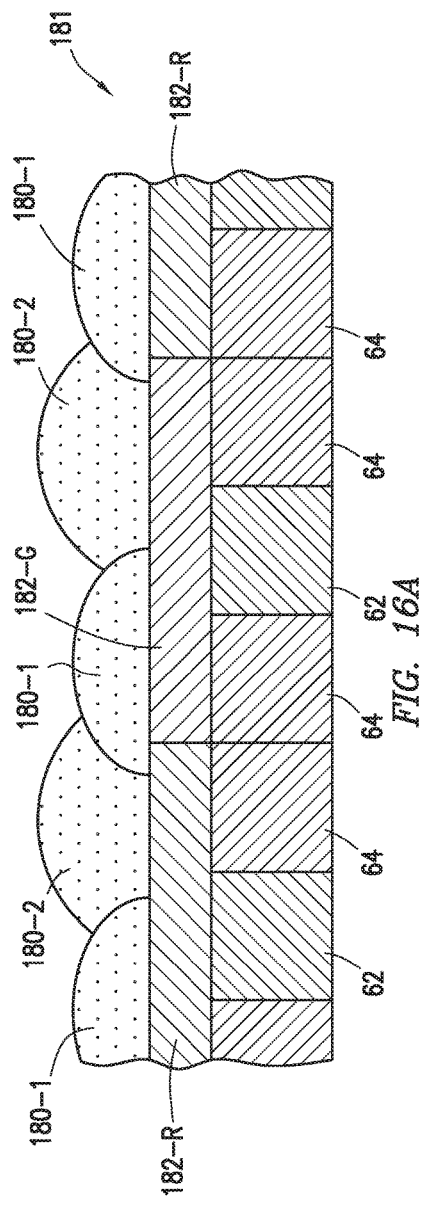
FIGS. 16A and 16B are diagrams showing how illustrative microlenses having different heights may be formed in two layers in accordance with an embodiment.
Figure 16B:
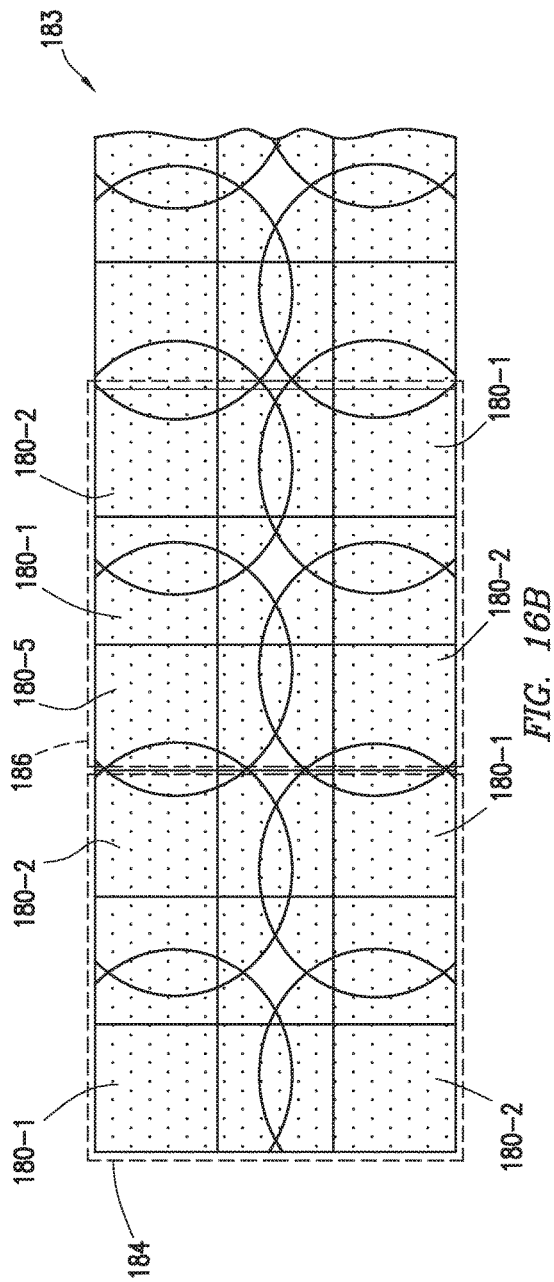

FIG. 16A illustrates microlenses 180 that may overlap one another. Microlenses 180 may be formed at different times. As an example, the first set of microlenses 180-1 may be formed at a first time, and the second set of microlenses 180-2 may be formed at a second time subsequent to the first time. Microlenses 180 may have non-uniform heights. Specifically, the second set of microlenses 180-2 may have a height that is greater than the height of the first set of microlenses 180-1. Microlenses 180 may be formed over a 3-by-3 array of photosensitive regions 62 and 64. As shown in plan view 183 of FIG. 16B, microlenses 180 may overlap one another. Specifically, microlenses 180-2 in pixel 184 may overlap other microlenses 180-1 within a pixel 184, and may also overlap other microlenses 180-1 within a neighboring pixel 186.

Figure 17:
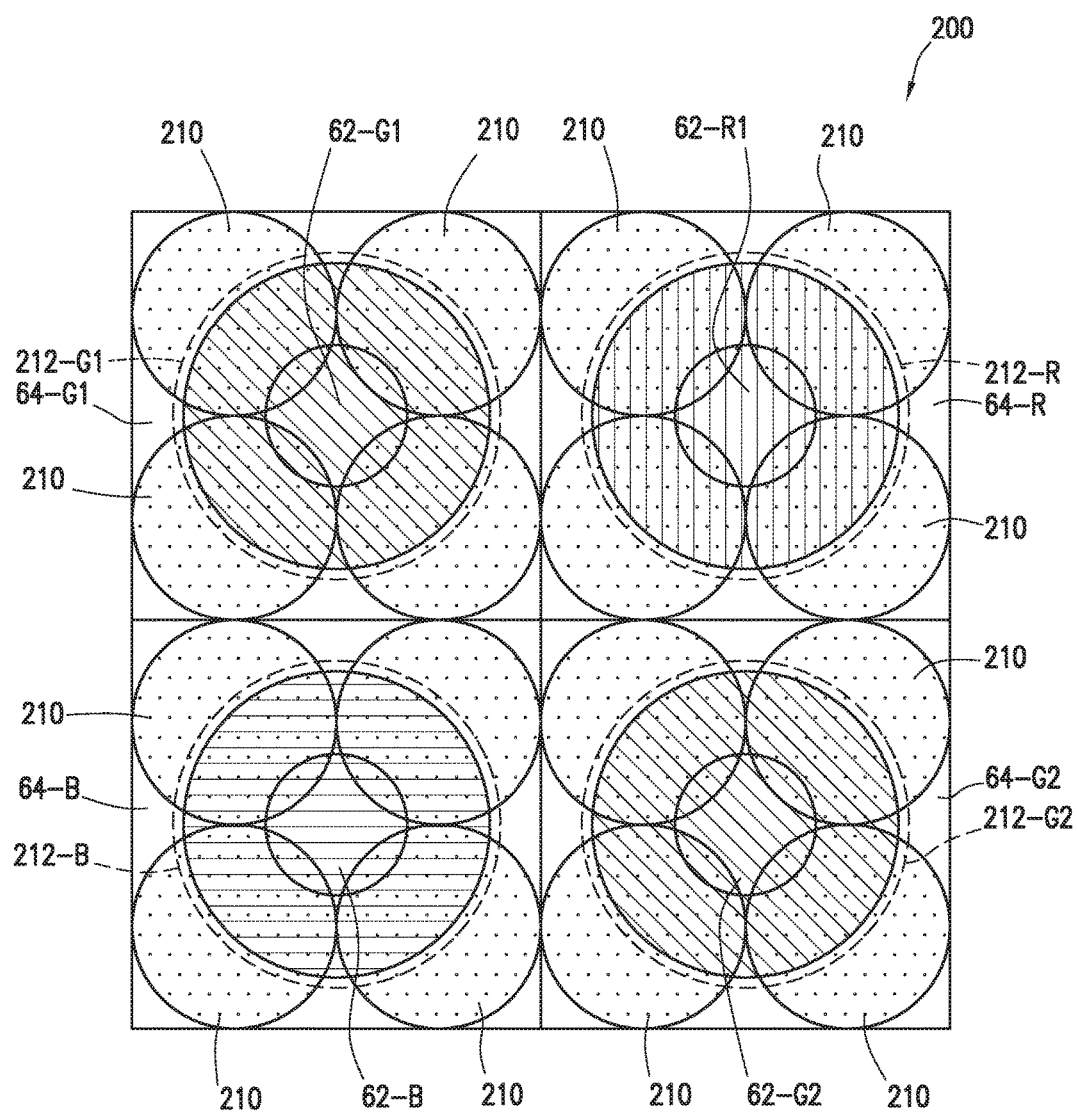
FIG. 17 is a diagram of hybrid color filters formed over a nested photosensitive region in accordance with an embodiment.

FIG. 17 illustrates a hybrid color filter formed over an array 200 of nested photosensitive regions 60. Array 200 may include two rows and two columns of nested photosensitive regions 60. Array 200 may be a subset of the array 20 of FIG. 1. The first row of nested photosensitive regions may include a first nested photosensitive region of inner photosensitive region 62-G1 and outer photosensitive region 64-G1, and a second nested photosensitive region of inner photosensitive region 62-R and outer photosensitive region 64-R. The second row of nested photosensitive regions 60 may include a third nested photosensitive region of inner photosensitive region 62-B and outer photosensitive region 64-B, and a fourth nested photosensitive region of inner photosensitive region 62-G2 and outer photosensitive region 64-G2. Although inner photosensitive region 62 and outer photosensitive region 64 are illustrated as structures corresponding to the embodiment of FIG. 5, the nested photosensitive region embodiments of any of the aforementioned configurations of various shapes may be used with the hybrid color filters illustrated in FIG. 17. Similarly, although the circular microlenses 210 are arranged in a manner similar to the arrangement of FIG. 13, any of the microlenses arrangements illustrated in FIGS. 11, 12, and 14 may be formed over the hybrid color filters illustrated in FIG. 17.

A color filter that is clear (i.e., made of a material that passes visible spectrum light) over regions of outer photosensitive region 64-G1, and that is green (i.e., made of a material that passes only green light) in a region 212-G1 may be formed over the first nested photosensitive region of inner photosensitive region 62-G1 and outer photosensitive region 64-G1.

Green filter region 212-G1 may be formed over portions of outer photosensitive region 64-G1 and the entirety of inner photosensitive region 62-G1. A color filter that is clear over regions of outer photosensitive region 64-R, and that is red (i.e., made of a material that passes only red light) in a region 212-R may be formed over the second nested photosensitive region of inner photosensitive region 62-R and outer photosensitive region 64-R. Red filter region 212-R may be formed over portions of outer photosensitive region 64-R and the entirety of inner photosensitive region 62-R.

A color filter that is clear over regions of outer photosensitive region 64-B, and that is blue (i.e., made of a material that passes only blue light) in a region 212-B may be formed over the second nested photosensitive region of inner photosensitive region 62-B and outer photosensitive region 64-B. Blue filter region 212-B may be formed over portions of outer photosensitive region 64-B and the entirety of inner photosensitive region 62-B. A color filter that is clear over regions of outer photosensitive region 64-G2, and that is green in a region 212-G2 may be formed over the fourth nested photosensitive region of inner photosensitive region 62-G2 and outer photosensitive region 64-G2. Green filter region 212-G2 may be formed over portions of outer photosensitive region 64-G2 and the entirety of inner photosensitive region 62-G2.

The color filters described above in connection with array 200 have color filter regions 212 that are arranged in a Bayer pattern. However, color filter regions 212 may have any pattern in an array 200. Color filter regions 212 are not limited to red, green, and blue filter regions but may alternatively include near-infrared regions that pass only near-infrared wavelengths. Regions 212 may alternatively be clear, so that the entire color filter over a given nested photosensitive region is a clear color filter. Clear color filter regions described above in connection with the color filters of array 200 may alternatively be filter regions that exhibit at least the same amount of light transmittance as color filter regions 212 of the hybrid color filters. As an example, instead of clear regions, a hybrid color filter may have yellow color filter regions that are at least as sensitive to light (i.e., having at least the same light transmittance over the visible spectrum) as the color filter regions 212.

The design of FIG. 17 may further increase the sensitivity of outer photosensitive regions and capture more light (i.e., full-spectrum light, as opposed to color-filtered light), which may be particularly desirable in low-light imaging conditions. Additionally, a barrier between the filters over photosensitive regions 62 and 64 may be formed to reflect the light away from inner photosensitive region 62. The barrier may be formed above an isolation region (similar to isolation region 66) formed between photosensitive regions 62 and 64, which is omitted from the illustration of FIG. 17 to maintain clarity. Similarly, even if the same color filter is formed over a particular pair of nested photosensitive regions 60, a barrier might be formed between photosensitive region 62 and 64 to increase the ratio of the photosensitive region light sensitivities of photosensitive region 62 and 64.

Figure 18:
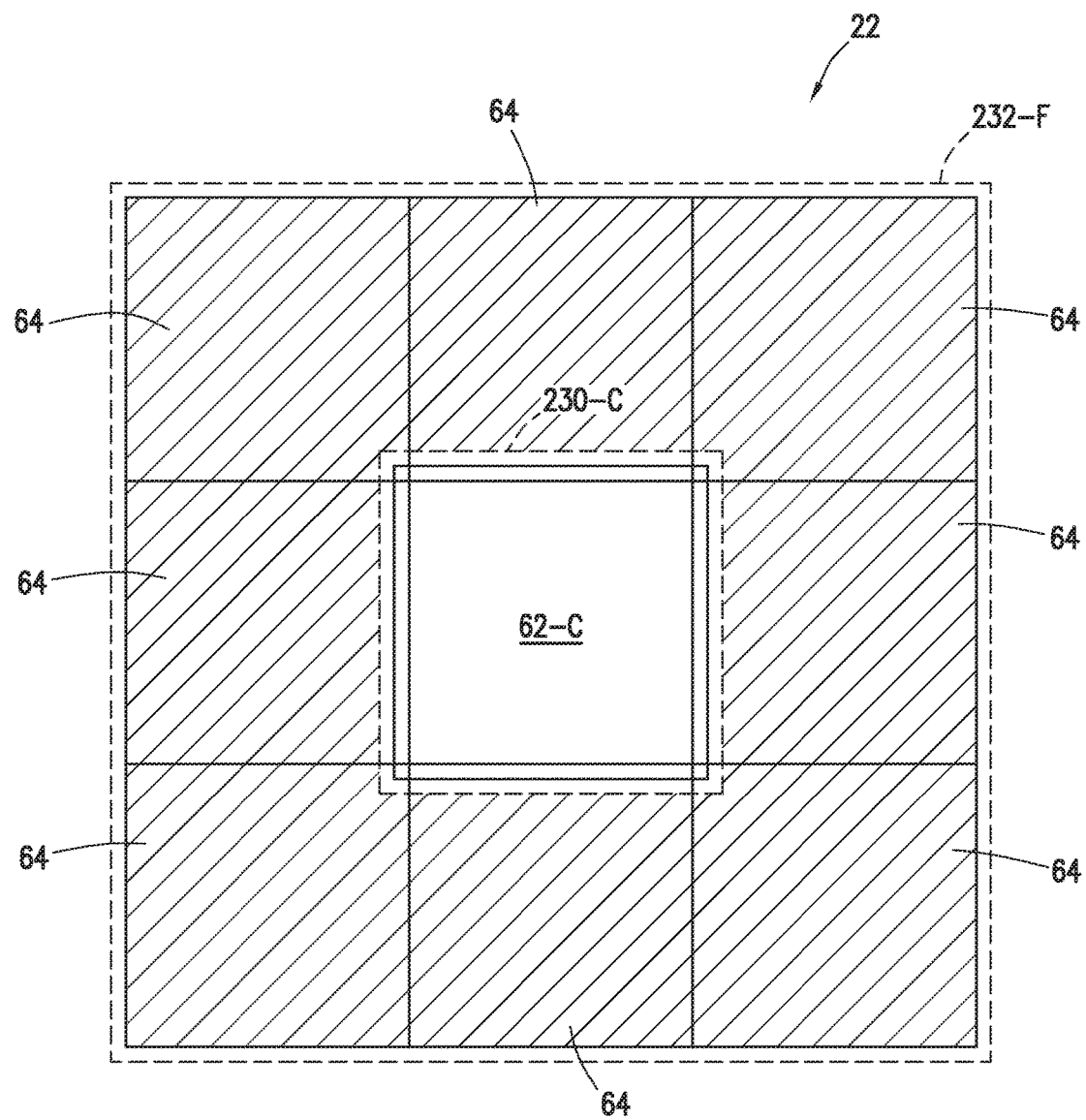
FIG. 18 illustrates a hybrid color filter with a clear filter over an inner photosensitive region in accordance with an embodiment.

FIG. 18 shows pixel 60 with an inner photosensitive region 62-C over which clear filter 230-C is formed. While a 3-by-3 pixel 60 is illustrated in FIG. 18, any of the aforementioned pixel geometries in accordance with FIG. 5 may be used with clear filter 230-C formed over the respective inner photosensitive region of the particular pixel geometry. A color filter 232-F may be formed over the photosensitive sub-regions in outer photosensitive region 64. It can be appreciated that any of the preceding designs for microlenses, inner photosensitive regions, and outer photosensitive regions may be used with such a filter configuration, by forming a clear filter element over an inner photosensitive region or an inner photosensitive region and by forming a color filter element over an outer photosensitive sub-region or the combined outer photosensitive region.

Because clear filters such as clear filter 230-C do not filter light, clear filters may be said to allow more light per unit area relative to color filters such as color filter 232-F. Although the light allowed by clear filter 230-C and color filter 232-F depends on the light incident on these filters, it can be appreciated that clear filter 230-C transmits at least as much light as color filter 232-F. Clear filters such as clear filter 230-C may also be said to transmit broad spectrum light, whereas color filters 232-F may be said to transmit subsets or sub-spectra of broad spectrum light. Because the spectrum of light passed by color filters is a sub-spectrum of the broad spectrum light passed by clear filters, the transmission spectrum of a clear filter may be said to differ from the transmission spectrum of a color filter.

Figure 19:
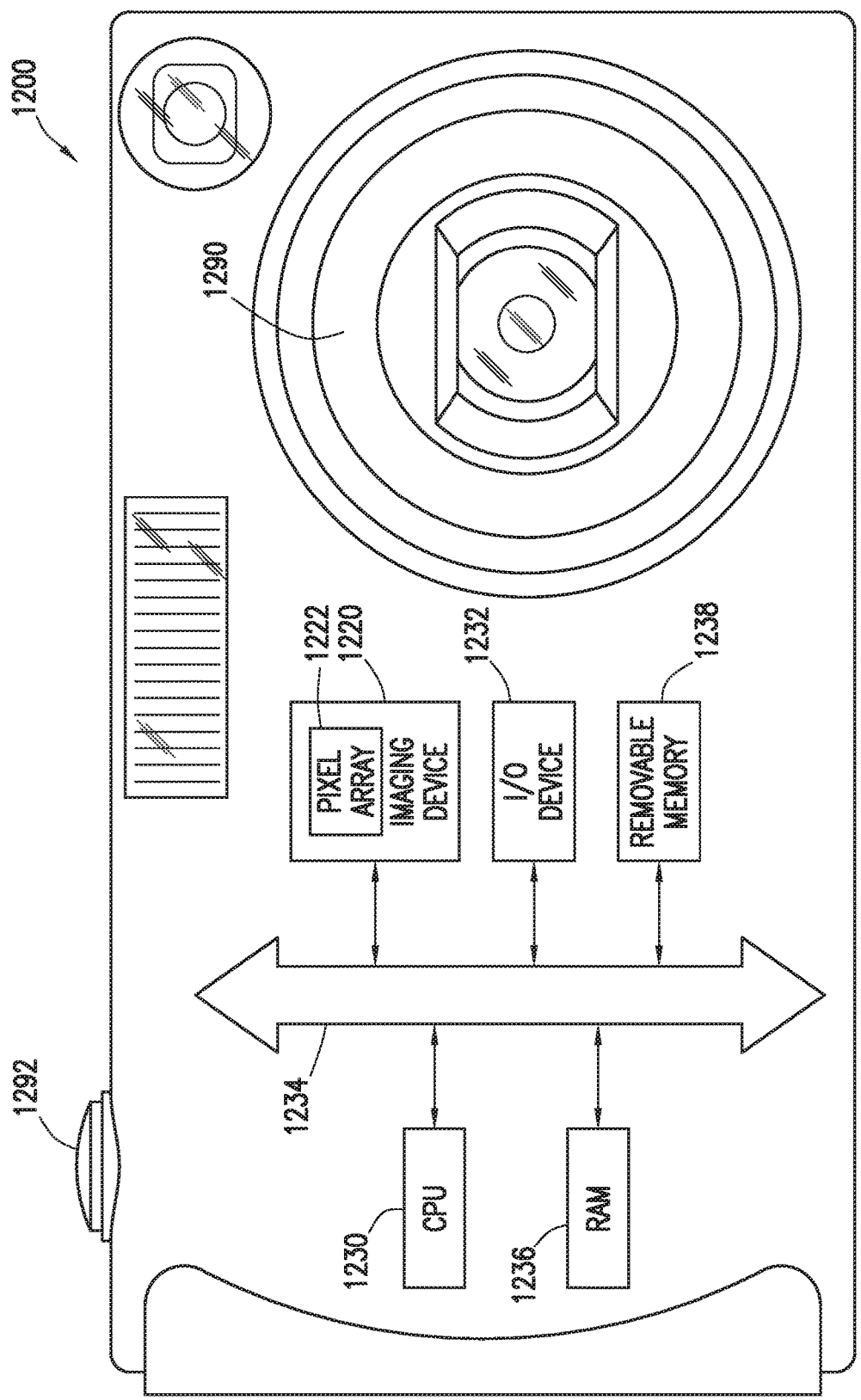
FIG. 19 is a block diagram of an imager that may employ the embodiments of FIGS. 1-18 in accordance with an embodiment.

FIG. 19 shows, in simplified form, a typical processor system 1200, such as a digital camera, which includes an imaging device 1220. Imaging device 1220 may include a pixel array 1222 of the type shown in FIG. 1 (e.g., pixel array 1222 may be an implementation of pixel array 20 of FIG. 1) having pixels with nested photosensitive regions as described above in connection with FIGS. 2-18. Processor system 1200 is exemplary of a system having digital circuits that may include imaging device 1200. Without being limiting, such a system may include a computer system, still or video camera system, scanner, machine vision, vehicle navigation, video phone, surveillance system, auto focus system, star tracker system, motion detection system, image stabilization system, and other systems employing an imaging device.

Processor system 1200, which may be a digital still or video camera system, may include a lens such as lens 1290 for focusing an image onto a pixel array such as pixel array 1222 when shutter release button 1292 is pressed. Processor system 1200 may include a central processing unit such as central processing unit (CPU) 1230. CPU 1230 may be a microprocessor that controls camera functions and one or more image flow functions and communicates with one or more input/output (I/O) devices 1232 over a bus such as bus 1234. Imaging device 1220 may also communicate with CPU 1230 over bus 1234. System 1200 may include random access memory (RAM) 1236 and removable memory 1238. Removable memory 1238 may include flash memory that communicates with CPU 1230 over bus 1234. Imaging device 1220 may be combined with CPU 1230, with or without memory storage, on a single integrated circuit or on a different chip. Although bus 1234 is illustrated as a single bus, it may be one or more buses or bridges or other communication paths used to interconnect the system components.

Various embodiments have been described illustrating image sensors that have pixels with nested photosensitive regions with at least an inner photosensitive region and at least an outer photosensitive region. Image sensors having pixels with nested photosensitive regions may be used in an imaging system such as an electronic device.

A pixel with nested photosensitive regions may include an inner photosensitive region that has a light collecting area of any geometric shape. In an example, the inner photosensitive region may have a square light collecting area. The inner photosensitive region may be formed in a substrate and may be nested within or immediately surrounded by an outer photosensitive region on at least one side. The light collecting area of the outer photosensitive regions that surround the inner photosensitive region in nested photosensitive region may have a higher sensitivity to light than that of the inner photosensitive region. In bright light conditions, the inner photosensitive region, which may contain a number of charges that are diffused or leaked from the outer photosensitive region that surrounds the inner photosensitive region, may provide a non-saturated image signal that can be used in to produce an accurate image despite the bright light conditions. In low light conditions, the outer photosensitive region with more sensitive light collecting areas will generate sufficient charges to accurately image the low light conditions. In this way, nested photosensitive regions to have a high dynamic range response to incident light. As an example, nested photosensitive regions may also be used to remove or reduce motion artifacts, flickering, and other undesirable image aberrations or deficiencies, that are present and to a degree inherent in conventional multi-exposure image sensors.

The outer photosensitive region and the inner photosensitive region may be separated by an isolation region. The interface surface of the isolation region may be perpendicular to the light collecting surface of the inner photodiode. Alternatively, the interface surface of the isolation region may be non-perpendicular (i.e., greater than, or less than 90 degrees) with respect to the light collecting surface of the inner photodiode.

The pixel with nested photosensitive regions may include trunk circuitry and transistor circuitry. Trunk circuitry may include a voltage supply source, a charge storage node, and readout transistors. Trunk circuitry may be located in close proximity to both the inner and outer photosensitive regions. Trunk circuitry may have a first side that is adjacent to respective second and third sides of the inner and outer photosensitive regions that both oppose the first side. Transistor circuitry may couple the inner photosensitive region, the outer photosensitive region, and trunk circuitry to one another. As an example, transistor circuitry may couple the trunk circuitry (e.g., trunk circuitry on either the pixel that includes the outer photosensitive region or an adjacent pixel) to the outer photosensitive region. As a further example, transistor circuitry may couple the outer photosensitive region to the inner photosensitive region by bridging over the isolation region. As a further example, transistor circuitry may couple the inner photosensitive region to the trunk circuitry.

One or more microlenses may be formed over the nested photosensitive regions. One, four, eight, nine, or any other suitable number of microlenses may be formed over the nested photosensitive regions. The one or more microlenses formed over the nested photosensitive regions may direct light only to the outer photosensitive region in the nested photosensitive regions. Circular microlenses may be centered over regions of the outer photosensitive region. Toroidal microlenses may be formed having a hole such that no portion of the toroidal microlens is formed over the inner photosensitive region in the nested photosensitive regions.

A color filter of a single color may be formed over a given nested photosensitive region. In this way, charges that leak from an outer photosensitive region to an inner photosensitive region of the nested photosensitive regions will correspond to photo-generated of the same color as those generated in the inner photosensitive region as a result of light incident on the inner photosensitive region. In certain embodiments, hybrid color filters having a clear region that passes all colors of visible light may be formed over a first region of the outer photosensitive group. In hybrid color filter embodiments, a color filter region may be formed over a second portion of the outer photosensitive region of the nested photosensitive regions, and over the entirety of the inner photosensitive region of the nested photosensitive regions.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor pixel, comprising:
   a first photosensitive region that stores a charge;
   a second photosensitive region;
   trunk circuitry that comprises a charge storage node, wherein the second photosensitive region is substantially surrounded by the trunk circuitry and the first photosensitive region; and
   transistor circuitry that is configured to transfer the charge from the first photosensitive region to the storage node in the trunk circuitry through the second photosensitive region.

2. The image sensor pixel defined in claim 1, wherein the transistor circuitry comprises a first transistor that is configured to transfer the charge from the first photosensitive region to the second photosensitive region and a second transistor that is configured to transfer the charge from the second photosensitive region to the storage node in the trunk circuitry.

3. The image sensor pixel defined in claim 2, wherein the trunk circuitry further comprises:
   a reset transistor that couples the charge storage node to a voltage supply having a supply voltage level; and
   readout circuitry that reads out pixel image signals corresponding to from the charge storage node.

4. The image sensor pixel defined in claim 2, further comprising:
   a semiconductor substrate having opposing first and second surfaces, wherein the trunk circuitry and the first photosensitive region substantially surround the second photosensitive region at the first surface and wherein the first photosensitive region substantially surrounds the second photosensitive region at the second surface.

5. The image sensor pixel defined in claim 4, further comprising:
   an isolation region interposed between the first and second photosensitive regions that extends from the first surface to the second surface.

6. The image sensor pixel defined in claim 5, wherein the isolation region is interposed between the first and second photosensitive regions at the first and second surfaces of the semiconductor substrate and is further interposed between the trunk circuitry and the second photosensitive region at the second surface of the semiconductor substrate.

7. The image sensor pixel defined in claim 6, wherein, at the second surface, the isolation region has a first portion interposed between the trunk circuitry and a first side of the second photosensitive region, a second portion interposed between the first photosensitive region and a second side of the second photosensitive region, a third portion interposed between the first photosensitive region and a third side of the second photosensitive region, and a fourth portion interposed between the first photosensitive region and a fourth side of the second photosensitive region, and wherein the first side of the second photosensitive region opposes the third side of the second photosensitive region.

8. The image sensor pixel defined in claim 7, wherein the second transistor bridges the first portion of the isolation region at the second surface and has a first terminal coupled to the trunk circuitry and a second terminal coupled to the first side of the second photosensitive region.

9. The image sensor pixel defined in claim 8, wherein the first transistor bridges the fourth portion of the isolation region at the second surface, and wherein the first transistor has a first terminal coupled to the fourth side of the second photosensitive region and a second terminal coupled to the first photosensitive region.

10. The image sensor pixel defined in claim 8, wherein the first transistor bridges the third portion of the isolation region at the second surface, and wherein the first transistor has a first terminal coupled to the third side of the second photosensitive region and a second terminal coupled to the first photosensitive region.

11. An image sensor pixel, comprising:
    an outer photosensitive region;
    an inner photosensitive region nested within the outer photosensitive region;
    an isolation structure interposed between the inner and outer photosensitive regions; and
    transistor circuitry formed over the isolation structure that has a first terminal coupled to the inner photosensitive region and a second terminal coupled to the outer photosensitive region.

12. The image sensor pixel defined in 11, further comprising:
    a voltage supply line that receives a supply voltage; and
    an anti-blooming gate that couples the outer photosensitive region to the voltage supply line and that is configured to reset the outer photosensitive region to the supply voltage.

13. The image sensor pixel defined in 11, further comprising:
    a color filter formed over the outer photosensitive region and in the inner photosensitive region.

14. The image sensor pixel defined in 13, wherein the color filter comprises:
    a first filtering region formed over the inner photosensitive region; and
    a second filtering region formed over the outer photosensitive region, wherein the first and second filtering regions transmit different respective spectrums of light.

15. The image sensor pixel defined in 14, further comprising:
    a microlens formed over the outer photosensitive region, wherein the outer photosensitive region has a higher sensitivity to light than the inner photosensitive region.

16. An image sensor, comprising:
    a first image sensor pixel comprising:
       a first photodiode that has a first charge storage capacity; and
       a second photodiode that has a second charge storage capacity that is greater than the first charge storage capacity;

a second image sensor pixel that is adjacent to the first image sensor pixel and that comprises trunk circuitry; and a transistor that couples the trunk circuitry in the second image sensor pixel to the second photodiode in the first image sensor pixel.

17. The image sensor defined in claim 16, wherein the first photodiode is nested within the second photodiode.

18. The image sensor defined in claim 17, wherein the second image sensor pixel comprises:

a third photodiode; and a fourth photodiode nested within the third photodiode.

19. The image sensor defined in claim 18, wherein the image sensor is configured operate the first and second image sensor pixels in a rolling shutter mode.

20. The image sensor defined in claim 18, wherein the image sensor is configured to operate the first and second image sensor pixels in a global shutter mode.

* * * * *